(12) United States Patent
Garland et al.

(10) Patent No.: US 12,508,265 B2
(45) Date of Patent: *Dec. 30, 2025

(54) METHODS AND COMPOSITIONS FOR REDUCING RADIATION INDUCED TOXICITY

(71) Applicant: Tosk, Inc., Mountain View, CA (US)

(72) Inventors: William A. Garland, Mountain View, CA (US); Brian D. Frenzel, Mountain View, CA (US); Philip Liaw, San Jose, CA (US)

(73) Assignee: Tosk, Inc., Mountain View, CA (US)

( * ) Notice: Subject to any disclaimer, the term of this patent is extended or adjusted under 35 U.S.C. 154(b) by 820 days.

This patent is subject to a terminal disclaimer.

(21) Appl. No.: 17/175,227

(22) Filed: Feb. 12, 2021

(65) Prior Publication Data

US 2021/0228583 A1 Jul. 29, 2021

Related U.S. Application Data

(63) Continuation-in-part of application No. PCT/US2019/046373, filed on Aug. 13, 2019.

(60) Provisional application No. 62/718,840, filed on Aug. 14, 2018.

(51) Int. Cl.
 *A61K 31/519* (2006.01)
 *A61K 31/7072* (2006.01)

(52) U.S. Cl.
 CPC ........ *A61K 31/519* (2013.01); *A61K 31/7072* (2013.01)

(58) Field of Classification Search
 CPC ..................... A61K 31/519; A61K 31/7072
 See application file for complete search history.

(56) References Cited

U.S. PATENT DOCUMENTS

| | | | |
|---|---|---|---|
| 5,296,216 A | 3/1994 | Turner | |
| 5,470,838 A | 11/1995 | von Borstel et al. | |
| 5,736,531 A | 4/1998 | von Borstel et al. | |
| 5,968,914 A | 10/1999 | von Borstel et al. | |
| 6,090,932 A | 7/2000 | McGee et al. | |
| 6,232,298 B1 | 5/2001 | von Borstel et al. | |
| 6,344,447 B2 | 2/2002 | von Borstel et al. | |
| 6,992,072 B2 | 1/2006 | Walker | |
| 7,166,581 B1 | 1/2007 | von Borstel et al. | |
| 7,709,459 B2 | 5/2010 | von Borstel et al. | |
| 7,776,838 B1 | 8/2010 | von Borstel et al. | |
| 7,998,967 B2 | 8/2011 | Garland et al. | |
| 8,853,227 B2 | 10/2014 | Garland et al. | |
| 9,382,287 B2 | 7/2016 | Garland et al. | |
| 9,700,547 B2 | 7/2017 | Basso et al. | |
| RE48,253 E | 10/2020 | Garland et al. | |
| 2004/0029823 A1 | 2/2004 | McKay et al. | |
| 2009/0325969 A1 | 12/2009 | Garland et al. | |
| 2011/0319419 A1* | 12/2011 | Garland .................. | A61P 35/02 |
| | | | 514/249 |
| 2012/0029071 A1 | 2/2012 | Biswal et al. | |
| 2012/0294869 A1 | 11/2012 | Pizzorno et al. | |
| 2015/0072945 A1 | 3/2015 | Garland et al. | |
| 2016/0193354 A1 | 7/2016 | Noe et al. | |
| 2020/0397790 A1 | 12/2020 | Garland et al. | |
| 2021/0236530 A1 | 8/2021 | Garland et al. | |
| 2022/0008422 A1 | 1/2022 | Garland et al. | |

FOREIGN PATENT DOCUMENTS

| | | |
|---|---|---|
| EP | 0801062 A1 | 10/1997 |
| JP | H06508846 A | 10/1994 |
| JP | H10511689 A | 11/1998 |
| WO | WO9301202 A1 | 1/1993 |
| WO | WO9426761 A1 | 11/1994 |
| WO | WO9601115 A1 | 1/1996 |
| WO | WO03099297 A1 | 12/2003 |
| WO | WO2005020885 A2 | 3/2005 |
| WO | WO2005026186 A1 | 3/2005 |
| WO | WO2009114325 A2 | 9/2009 |
| WO | WO2020036982 A1 | 2/2020 |

OTHER PUBLICATIONS

Zidan et. al. (Cancer (1987) 59:24-26) (Year: 1987).*
Sonis et. al. (Expert Opinion on Investigational drugs (published on line Jan. 17, 2018) 27:147-154). (Year: 2018).*
Gupta et. al. (Clinical Radiology (1987) 38:575-581) (Year: 1987).*
Villa et. al. (Expert Opinion on Pharmacotherapy (2016) 17:1801-1807). (Year: 2016).*
Yuan et. al. (Expert Opinion on Emerging Drugs (2014) 19:343-351). (Year: 2014).*
Aghamohammadi et. al. (Investigative Cancer Therapies (2016) 15:60-68). (Year: 2016).*
Veres et al., The effect of the 3'-OH group on the conformation and binding ability of anhydropyrimidine nucleosides to uridine phosphorylase, Archives of Biochemistry and Biophysics, Apr. 1991, vol. 286, No. 1, p. 1-5, abstract only.
Karimi Khezri et al., Anti-Apoptotic and Anti-Oxidant Effects of Systemic Uridine Treatment in an Experimental Model of Sciatic Nerve Injury, Turk Neurosurg, Mar. 2021, p. 1-6.

(Continued)

*Primary Examiner* — Marcos L Sznaidman
(74) *Attorney, Agent, or Firm* — Darya C. Cheng; Bret E. Field; Bozicevic, Field & Francis LLP

(57) ABSTRACT

Methods for reducing radiation therapy induced toxicity, e.g., mucositis, in a subject are provided. Aspects of the methods include administering an effective amount of a radiation toxicity-reducing adjuvant to the subject. In certain embodiments, the radiation toxicity-reducing adjuvant is a 2,2'-anhydropyrimidine, or a derivative thereof. Also provided are compositions for use in practicing the subject methods. The subject methods and compositions find use in a variety of different applications, including the treatment of a variety of different disease conditions.

19 Claims, 8 Drawing Sheets

(56) References Cited

OTHER PUBLICATIONS

Sonis, Superoxide Dismutase as an Intervention for Radiation Therapy-Associated Toxicities: Review and Profile of Avasopasem Manganese as a Treatment Option for Radiation-Induced Mucositis, Drug Design, Development and Therapy, Mar. 2021, vol. 15, p. 1021-1029.

Veres et al., Inhibition of uridine phosphorylase by pyrimidine nucleoside analogs and consideration of substrate binding to the enzyme based on solution conformation as seen by NMR spectroscopy, Eur. J. Biochem., Aug. 1988, vol. 178, p. 173-181.

Ashour et al., 5-(m-Benzyloxybenzyl)barbituric acid acyclonucleoside, a uridine phosphorylase inhibitor, and 2',3',5'-tri-O-acetyluridine, a prodrug of uridine, as modulators of plasma uridine concentration. Implications for chemotherapy, Biochem Pharmacol (1996), 51(12):1601-1611.

Ashour et al., Effect of 5-(phenylselenenyl)acyclouridine, an inhibitor of uridine phosphorylase, on plasma concentration of uridine released from 2',3',5'-tri-O-acetyluridine, a prodrug of uridine: relevance to uridine rescue in chemotherapy, Cancer Chemother Pharmacol (2000), 46(3):235-240.

Ashour et al., Modulation of 5-fluorouracil host toxicity by 5-(benzyloxybenzyl)barbituric acid acyclonucleoside, a uridine phosphorylase inhibitor, and 2',3',5'-tri-O-acetyluridine, a prodrug of uridine, Biochem Pharmacol (2000), 60(3):427-431.

Brunetti et al., 5-Fluorouracil enhances azidothymidine cytotoxicity: in vitro, in vivo, and biochemical studies, Cancer Res (1990), 50(13):4026-4031.

Christensen et al., Effect of hydration on methotrexate plasma concentrations in children with acute lymphocytic leukemia, J Clin Oncology (1988), 6(5):797-801.

Darnowski et al., Fluorouracil plus azidothymidine cytotoxicity in vitro: Relationship to cellular thymidine kinase activity, Proc of American Assoc for Cancer Research (1990), 31:398.

Darnowski et al., Resistance to Azido-Thymidine Cytotoxicity in the Human Colon Tumor Cell Line HCT15 is Associated with Enhanced Removal of AZT from Cellular DNA, Proc of American Assoc for Cancer Research (1991), 32:358.

Drabikowska et al., Inhibitor properties of some 5-substituted uracil acyclonucleosides, and 2,2'-anhydrouridines versus uridine phosphorylase from *E. coli* and mammalian sources, Biochem Pharmacol (1987), 36(23):4125-4128.

Ettmayer et al., Lessons learned from marketed and investigational prodrugs, Medicinal Chemistry (2004), 47(10):2393-2404.

Howell et al., Cytokinetic comparison of thymidine and leucovorin rescue of marrow in humans after exposure to high-dose methotrexate, Cancer Res (1979), 39(4):1315-1320.

Howell et al., Thymidine Rescure of High-Dose Methotrexate in Humans, Cancer Res (1978), 38(2): 325-330.

Iigo et al., Differential effects of 2,2'-anhydro-5-ethyluridine, a uridine phosphorylase inhibitor, on the antitumor activity pf 5-fluorouridine and 5-fluoro-2'-deoxyuridine, Biochem Pharmacol (1990), 39(7):1247-1253.

Martin et al., High-dose 5-fluorouracil with delayed uridine "rescue" in mice, Cancer Res (1982), 42(10):3964-3970.

Martin et al., Use of oral uridine as a substitute for parenteral uridine rescue of 5-fluorouracil therapy, with and without the uridine phosphorylase inhibitor 5-benzylacyclouridine, Cancer Chemother Pharmacol (1989), 24(1):9-14.

Mazokopakis et al., Wild chamomile (*Matricaria recutita* L.) mouthwashes in methotrexate-induced oral mucositis, Phytomedicine (2005), 12(1-2):25-27.

Morissette et al., High-throughput crystallization: polypmorphs, salts, co-crystals and solvates of phramaceutical solids, Adv Drug Deliv Rev (2004), 56(3):275-300.

Newman et al., Increased Sensitivity to Azidothymidine in a Subline of CCRF-CEM Human Leukemia Cells Resistant to Methotrexate, Proceedings of the American Assoc. for Cancer Research (1991), 32:413.

Pizzorno et al., Phase I clinical and pharmacological studies of benzylacyclouridine, a uridine phosphorylase inhibitor, Clin Cancer Res (1998), 4(5):1165-1175.

Scanlon et al., Overexpression of DNA replication and repair enzymes in cisplatin-resistant human colon carcinoma HCT8 cells and circumvention by azidothymidine, Cancer Commun (1989), 1(4):269-275.

Semon et al., Potentiation of the Antitumor Activity of Methotrexate by Concurrent Infusion of Thymidine, Cancer Res (1978), 38:2905-2911.

Stella, Prodrugs as therapeutics, Expert Opinion on Therapeutic Patents (2004), 14,(3):277-280.

Sterba et al., High-dose methotrexate and/or leucovorin rescue for the treatment of children with lymphoblastic malignancies: do we really know why, when and how?, Neoplasma (2005), 52 6):456-463.

Tattersall et al., The reversal of methotrexate toxicity by thymidine with maintenance of antitumour effects, Nature (1975), 253 (5488):198-200.

Testa, Prodrug research: futile or fertile?, Biochemical Pharmacology (2004), 68(11):2097-2106.

Tosi et al., Azidothymidine-induced cytotoxicity and incorporation into DNA in the human colon tumor cell line HCT-8 is enhanced by methotrexate in vitro and in vivo, Cancer Res (1992), 52(15):4069-4073.

Veres et al., 5-Substituted-2,2'-anhydrouridines, potent inhibitors of uridine phosphorylase, Biochem Pharmacol (1985), 34(10):1737-1740.

Vippagunta et al. Crystalline solids, Adv Drug Deliv Rev (2001), 48(1):3-26.

Weber et al., Azidothymidine inhibition of thymidine kinase and synergistic cytotoxicity with methotrexate and 5-fluorouracil in rat hepatoma and human colon cancer cells, Cancer Commun (1990), 2(4):129-133.

Weber et al., AZT: a biochemical response modifier of methotrexate and 5-fluorouracil cytotoxicity in human ovarian and pancreatic carcinoma cells, Cancer Commun (1991), 3(4):127-132.

Weber et al., Regulation of de novo and salvage pathways in chemotherapy, Adv Enzyme Regul (1991), 31:45-67.

Wolff, Burger's Medicinal Chemistry and Drug Discovery, 5th edition (1994), vol. 1, pp. 975-977.

Le et al., Uridine Prevents Fenofibrate-Induced Fatty Liver, PLoS One, Jan. 2014, vol. 9, No. 1, p. 1-14.

Cicko et al., Uridine supplementation exerts anti-inflammatory and anti-fibrotic effects in an animal model of pulmonary fibrosis, Respiratory Research, 2015, vol. 16, No. 105, p. 1-10.

Labbe et al., Drug-induced liver injury through mitochondrial dysfunction: mechanisms and detection during preclinical safety studies, Fundamental & Clinical Pharmacology, Aug. 2008, vol. 22, No. 4, p. 335-353.

PubChem CID 73805817, May 29, 2014, Retrieved from the Internet on May 4, 2022, URL: https://pubchem.ncbi.nlm.nih.gov/compound/73805817, 8 pages.

Tang et al., Inhibition of Autotaxin with GLPG1690 Increases the Efficacy of Radiotherapy and Chemotherapy in a Mouse Model of Breast Cancer, Molecular Cancer Therapeutics, Sep. 23, 2019, p. 1-13.

Leyva et al., Phase I and Pharmacokinetic Studies of High-Dose Uridine Intended for Rescue from 5-Fluorouracil Toxicity, Cancer Research, Dec. 1984, vol. 44, p. 5928-5933.

Maria et al., Radiation-Induced Oral Mucositis, Frontiers in Oncology, May 2017, vol. 7, Art. 89, p. 1-23.

Renck et al., Human uridine phosphorylase-1 inhibitors: a new approach to ameliorate 5-fluorouracil-induced intestinal mucositis, Invest New Drugs, Jul. 2014, vol. 32, p. 1301-1307.

Al Safarjalani et al., 5-(Phenylthio)acyclouridine: a powerful enhancer of oral uridine bioavailability: relevance to chemotherapy with 5-fluorouracil and other uridine rescue regiments, Cancer Chemother Pharmacol, Feb. 2005, vol. 55, p. 541-551.

Da Silva et al., Therapeutic effect of uridine phosphorylase 1 (UPP1) inhibitor on liver fibrosis in vitro and in vivo, European Journal of Pharmacology, Jan. 2021, vol. 890, No. 173670, p. 1-11.

(56) References Cited

OTHER PUBLICATIONS

Saif et al., 5-Fluorouracil dose escalation enabled with PN401 (triacetyluridine): toxicity reduction and increased antitumor activity in mice, Cancer Chemother Pharmacol, 2006, vol. 58, p. 136-142.

Golovinski et al., Antiviral, Antibacterial and Antitumor Activity of the Hydrazide and the Ethyl Ester of 2,2'-Anhydro-I-(p-D-arabinofuranosyl)-orotic Acid, Arzneim.-Forsch. Drug Res. 30 (II), Nr. 12 (1980), p. 2087-2090.

Mundt et al., Pulmonary fibrosis after chemotherapy with oxaliplatin and 5-fluorouracil for colorectal cancer, Oncology, 2007, vol. 73, Nos. 3-4, Abstract only, 2 pages.

Müller et al., "Drug-Induced Pulmonary Damage", Therapiebedingte Lungenveränderungen, Der Pathologe; Organ Der Deutschen Abteilung Der Internationalen Akademie Für Pathologie, Der Deutschen, Der Österreichischen Und Der Schweizerischen Gesellschaft Für Pathologie Und Des Berufsverbandes Deutscher Pathologen, Springer, Berlin, DE, vol. 27, No. 1, Feb. 2006, p. 19-26, and its English abstract, 10 pages.

Dai et al., Chamomile: A Review of Its Traditional Uses, Chemical Constituents, Pharmacological Activities and Quality Control Studies, Molecules, 2023, vol. 28, No. 133, p. 1-43.

Roberts et al., Selective prebiotic conversion of pyrimidine and purine anhydronucleosides into Watson-Crick base-pairing arabinofuranosyl nucleosides in water, Nature Communications, 2018, vol. 9, No. 4073, p. 1-10.

Seiter et al., Uridine allows dose escalation of 5-fluorouracil when given with N-phosphonacetyl-L-aspartate, methotrexate, and leucovorin, Cancer, Mar. 1993, vol. 71, No. 5, p. 1875-1881.

Shannahoff et al., 2,2'-Anhydropyrimidine nucleosides. Novel syntheses and reactions, J. Org. Chem., Feb. 1973, vol. 38, No. 3, p. 593-598.

Connolly et al., Uridine and its nucleotides: biological actions, therapeutic potentials, Trends Pharmacol Sci, May 1999, vol. 20, No. 5, p. 218-225.

Melichar et al., Intestinal permeability in patients with chemotherapy-induced stomatitis, J Cancer Res Clin Oncol, May 2001, vol. 127, No. 5, p. 314-318.

\* cited by examiner

METHODS AND COMPOSITIONS FOR REDUCING RADIATION INDUCED TOXICITY

CROSS-REFERENCE TO RELATED APPLICATIONS

This application is a continuation in part application of International Application Serial No. PCT/US2019/046373 filed Aug. 13, 2019, which application, pursuant to 35 U.S.C. § 119 (e), claims priority to the filing date of U.S. Provisional Patent Application Ser. No. 62/718,840 filed Aug. 14, 2018; the disclosures of which applications are herein incorporated by reference.

INTRODUCTION

Radiation therapy is the medical use of radiation to treat malignant cells, such as cancer cells (https://www.cancer-.org/treatment/treatments-and-side-effects/treatment-types/radiation.html). Radiation employed in radiation therapy can have an electromagnetic form, such as a high-energy photon, or a particulate form, such as an electron, proton, neutron, or alpha particle.

Mucositis often develops as a complication of radiation therapy for cancer (Lu et al., "Radiation-induced intestinal damage: latest molecular and clinical developments," Future Oncol. (2019) 15:4105-4118). Mucositis is a condition characterized by swelling, irritation, inflammation, and discomfort of mucosal linings such as those of the alimentary and gastrointestinal tract, including oral and oropharyngeal cavities, as well as nasal, optical, vaginal, and rectal mucosa. Mucositis can result in mouth and throat sores, diarrhea, abdominal cramping and tenderness, and rectal ulcerations. Inflammation of mucosal membranes often involves infection and/or ulceration and can be a serious and often very painful disorder. Exposure to radiation often results in significant disruption of cellular integrity in mucosal epithelium and the underlying connective tissue, leading to inflammation, infection and/or ulceration at mucosal sites such as, for example, in the mouth, throat and other portions of the GI tract.

Mucositis adversely impacts the quality of life of cancer patients in several ways (Maria et al., "Radiation-Induced Oral Mucositis," Front Oncol. (2017) 7:89). Patients may experience intense pain, nausea, and gastro-enteritis. The mouth and throat sores of mucositis can cause significant pain and make it difficult to eat, drink, and even take oral medication. In general, symptoms of mucositis appear within five to ten days after the start of cancer treatment and can last several weeks after cessation of treatment.

The incidence of mucositis, as well as its severity, depends on factors such as the type and duration of the cancer treatment. Mucositis occurs, for example, in virtually all patients who are treated by irradiation of the head and neck (Trotti et al., "Mucositis incidence, severity and associated outcomes in patients with head and neck cancer receiving radiotherapy with or without chemotherapy: a systematic literature review," Radiother Oncol. (2003) 66: 253-62.) Mucositis is also highly prevalent in patients treated with high dose irradiation for the purpose of myeloablation in preparation for stem cell or bone marrow transplantation (Tayyem A Q, "Cryotherapy effect on oral mucositis severity among recipients of bone marrow transplantation: a literature review," Clin J Oncol Nurs. (2014)18: E84-7; and Chaudhry et al., "The Incidence and Severity of Oral Mucositis among Allogeneic Hematopoietic Stem Cell Transplantation Patients: A Systematic Review," Biol Blood Marrow Transplant. (2016) 22:605-616). Depending on severity, mucositis can limit subsequent doses of radiation and other treatments.

Efforts to counter the discomforts of mucositis can lead to disruptions in cancer treatment, alterations in treatment dosages, or shifting to different modes of treatment. Severe mucositis can also lead to the need for parenteral nutrition or hospitalization for several weeks (or more) of intravenous feeding because of the mouth ulcers, cramps, extreme pain, gut denuding, and severe diarrhea. Thus, the development of effective approaches to preventing and treating mucositis is important for improving the care of cancer patients.

Oral mucositis (OM) is an example of a specific type of mucositis, and is an acute, painful, costly, and sometimes debilitating complication of some cancer therapies. Oral mucositis is prevalent in patient populations with head and neck malignancies being treated with radiation therapy. The oral cavity is lined with mucosal epithelium, and exposure to radiation and/or chemotherapeutics results in the disruption of cellular integrity leading to the development of ulcerative lesions. Mucositis can be mild, requiring little intervention, to severe, involving hypovolemia, electrolyte abnormalities, and malnutrition, that may result in fatal complications. This condition affects a significant fraction of cancer patients world-wide.

Oral mucositis usually occurs after the second week of radiation therapy with severe symptoms usually resolving within six weeks following completion of therapy. In severe cases, oral mucositis can be extremely painful, preventing the patient from eating, and may require hospitalization for hydration, narcotics for pain, and/or total parenteral nutrition. Pain resulting from mucositis is often so severe that it is cited by cancer patients as the primary reason for discontinuing treatment. Patients suffering from oral mucositis have reported feeling as if they were drinking scalding hot water and scraping the inside of their mouth with coarse sand paper followed by running their tongue over a cheese grater. Oral mucositis can also be life-threatening because oral ulcerations can permit the entry of bacteria into the bloodstream, which can lead to fatality in the case of sepsis in a patient already immune-compromised by treatment for cancer. Oral mucositis is, therefore, a significant risk factor for life-threatening systemic infection, and the risk of systemic infection is exacerbated by concomitant neutropenia, which is another complication associated with chemotherapy. Patients with oral mucositis and neutropenia have a relative risk for a life-threatening systemic infection that is at least four times greater than that of individuals without oral mucositis.

The onset of oral mucositis usually involves a four-phase process: the primary phase is inflammatory/vascular in nature, marked by cytokine release from the epithelium brought on by damage caused by radiation and/or chemotherapy. The second phase, referred to as the epithelial phase, is signaled by atrophy and ulceration of the mucosal epithelium. The third phase is defined as the ulcerative/bacterial phase represented by ulcerative lesions that are prone to bacterial infection further compromising the patients' immune system. These painful lesions often limit a patient's ability to eat and drink and, in some cases, require hospitalization. The presence of these lesions can also interrupt scheduled chemotherapy and/or radiation treatments. The last phase, the healing phase, is characterized by a proliferation and differentiation of epithelium as well as bacterial control.

Virtually all patients treated for tumors of the head and neck, patients receiving radiation along the GI tract, and approximately 40% of those subjected to radiation therapy for tumors in other locations (leukemias or lymphomas) develop mucositis affecting the oral cavity and the rectum (Minerva, Stomatol. 2002: 51:173-86). For example, esophagitis (or esophageal mucositis) is a major complication of chemo and radiation therapy in patients with non-small cell lung cancer and can cause significant morbidity and result in treatment interruptions. Mucositis also affects 75-100 percent of patients receiving higher doses of chemotherapy for bone marrow transplantation. Mucositis afflicts over 400,000 patients a year in the US, and the incidence is growing as the need for radiation and chemotherapy treatments grows.

Mucositis patients are highly susceptible to infection, as a breach in the otherwise protective linings of the oral mucosa and gastrointestinal tract can have serious consequences. The alimentary canal and GI tract are colonized by a vast array of microorganisms, and mucosal lesions can serve as portals of entry for endogenous microorganisms, becoming sites of secondary infection.

SUMMARY

Methods for reducing radiation therapy induced toxicity, e.g., mucositis, in a subject are provided. Aspects of the methods include administering an effective amount of a radiation toxicity-reducing adjuvant to the subject. In certain embodiments, the radiation toxicity-reducing adjuvant is a 2,2'-anhydropyrimidine, or a derivative thereof. Also provided are compositions for use in practicing the subject methods. The subject methods and compositions find use in a variety of different applications, including the treatment of a variety of different disease conditions.

DEFINITIONS

Figure 1:
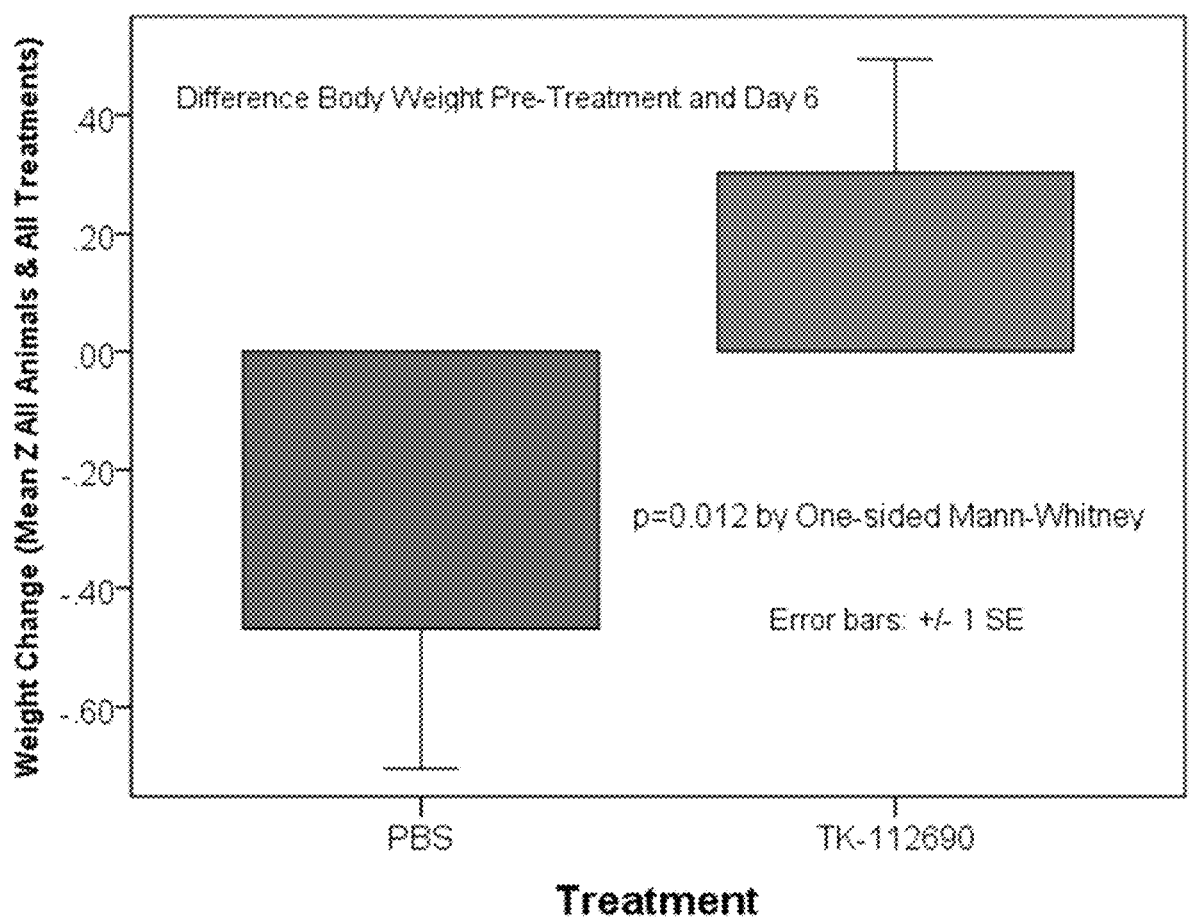
FIG. 1 depicts a set of data expressing the difference between the body weight pre-dose and on Day 6. Twenty-four mice were treated bid with TK-112690, a 2,2'-anhydropyrimidine radiation toxicity-reducing adjuvant, according to an embodiment of the invention. The test article doses were 60 mg/kg ip or 240 mg/kg po TK-112690 and uridine 60 mg/kg. Sixteen mice were treated with PBS. All animals were treated with 12 Gy total body radiation for 5 days. The difference in body weight (grams) between pre-treatment and day 6 was analyzed using z scores.

When describing the compounds, pharmaceutical compositions containing such compounds, and methods of using such compounds and compositions, the following terms have the following meanings unless otherwise indicated. It should also be understood that any of the moieties defined forth below may be substituted with a variety of substituents, and that the respective definitions are intended to include such substituted moieties within their scope.

"Acyl" refers to a radical —C(O)R, where R is hydrogen, alkyl, cycloalkyl, heterocycloalkyl, aryl, arylalkyl, heteroalkyl, or heteroaryl as defined herein. Representative examples include, but are not limited to, formyl, acetyl, cylcohexylcarbonyl, cyclohexylmethylcarbonyl, benzoyl, benzylcarbonyl, and the like.

"Acylamino" refers to a radical —NR'C(O)R, where R' is hydrogen, alkyl, cycloalkyl, heterocycloalkyl, aryl, arylalkyl, heteroalkyl, heteroaryl, heteroarylalkyl and R is hydrogen, alkyl, alkoxy, cycloalkyl, heterocycloalkyl, aryl, arylalkyl, heteroalkyl, heteroaryl or heteroarylalkyl, as defined herein. Representative examples include, but are not limited to, formylamino, acetylamino, cyclohexylcarbonylamino, cyclohexylmethyl-carbonylamino, benzoylamino, benzylcarbonylamino, and the like.

"Acyloxy" refers to the group —OC(O)H, —OC(O)-alkyl, —OC(O)-aryl or —OC(O)— cycloalkyl.

"Aliphatic" refers to hydrocarbyl organic compounds or groups characterized by a straight, branched or cyclic arrangement of the constituent carbon atoms and an absence of aromatic unsaturation. Aliphatics include, without limitation, alkyl, alkylene, alkenyl, alkynyl and alkynylene. Aliphatic groups typically have from 1 or 2 to 6 or 12 carbon atoms.

"Alkenyl" refers to monovalent olefinically unsaturated hydrocarbyl groups having up to about 11 carbon atoms, particularly, from 2 to 8 carbon atoms, and more particularly, from 2 to 6 carbon atoms, which can be straight-chained or branched and having at least 1 and particularly from 1 to 2 sites of olefinic unsaturation. Particular alkenyl groups include ethenyl (—CH=CH$_2$), n-propenyl (—CH$_2$CH=CH$_2$), isopropenyl (—C(CH$_3$)=CH$_2$), vinyl and substituted vinyl, and the like.

"Alkoxy" refers to the group —O-alkyl. Particular alkoxy groups include, by way of example, methoxy, ethoxy, n-propoxy, isopropoxy, n-butoxy, tert-butoxy, sec-butoxy, n-pentoxy, n-hexoxy, 1,2-dimethylbutoxy, and the like.

"Alkoxycarbonyl" refers to a radical —C(O)-alkoxy where alkoxy is as defined herein.

"Alkoxycarbonylamino" refers to the group —NRC(O)OR' where R is hydrogen, alkyl, aryl or cycloalkyl, and R' is alkyl or cycloalkyl.

"Alkyl" refers to monovalent saturated aliphatic hydrocarbyl groups particularly having up to about 12 or 18 carbon atoms, more particularly as a lower alkyl, from 1 to 8 carbon atoms and still more particularly, from 1 to 6 carbon atoms. The hydrocarbon chain may be either straight-chained or branched. This term is exemplified by groups such as methyl, ethyl, n-propyl, isopropyl, n-butyl, isobutyl, tert-butyl, n-hexyl, n-octyl, tert-octyl, and the like. The term "alkyl" also includes "cycloalkyls" as defined herein.

"Alkylene" refers to divalent saturated aliphatic hydrocarbyl groups particularly having up to about 12 or 18 carbon atoms and more particularly 1 to 6 carbon atoms which can be straight-chained or branched. This term is exemplified by groups such as methylene (—CH$_2$—), ethylene (—CH$_2$CH$_2$—), the propylene isomers (e.g., —CH$_2$CH$_2$CH$_2$— and —CH(CH$_3$)CH$_2$—), and the like.

"Alkynyl" refers to acetylenically unsaturated hydrocarbyl groups particularly having up to about 12 or 18 carbon atoms and more particularly 2 to 6 carbon atoms which can be straight-chained or branched and having at least 1 and particularly from 1 to 2 sites of alkynyl unsaturation. Particular non-limiting examples of alkynyl groups include acetylenic, ethynyl (—C≡CH), propargyl (—CH$_2$C≡CH), and the like.

"Amino" refers to the radical —NH$_2$.

"Amino acid" refers to any of the naturally occurring amino acids (e.g., Ala, Arg, Asn, Asp, Cys, Glu, Gln, Gly, His, Hyl, Hyp, lie, Leu, Lys, Met, Phe, Pro, Ser, Thr, Trp, Tyr, and Val) in D, L, or DL form. The side chains of naturally occurring amino acids are well known in the art and include, for example, hydrogen (e.g., as in glycine), alkyl (e.g., as in alanine, valine, leucine, isoleucine, proline), substituted alkyl (e.g., as in threonine, serine, methionine, cysteine, aspartic acid, asparagine, glutamic acid, glutamine, arginine, and lysine), alkaryl (e.g., as in phenylalanine and tryptophan), substituted arylalkyl (e.g., as in tyrosine), and heteroarylalkyl (e.g., as in histidine).

"Aminocarbonyl" refers to the group —C(O)NRR where each R is independently hydrogen, alkyl, aryl or cycloalkyl, or where the R groups are joined to form an alkylene group.

"Aminocarbonylamino" refers to the group —NRC(O)NRR where each R is independently hydrogen, alkyl, aryl or cycloalkyl, or where two R groups are joined to form an alkylene group.

"Aminocarbonyloxy" refers to the group —OC(O)NRR where each R is independently hydrogen, alkyl, aryl or cycloalky, or where the R groups are joined to form an alkylene group.

"Amino-containing saccharide group" refers to a saccharide group having an amino substituent. Representative amino-containing saccharide include L-vancosamine, 3-desmethyl-vancosamine, 3-epi-vancosamine, 4-epi-vancosamine, acosamine, actinosamine, daunosamine, 3-epi-daunosamine, ristosamine, N-methyl-D-glucamine, and the like.

"Aralkyl" or "arylalkyl" refers to an alkyl group, as defined above, substituted with one or more aryl groups, as defined above.

"Aryl" refers to a monovalent aromatic hydrocarbon group derived by the removal of one hydrogen atom from a single carbon atom of a parent aromatic ring system. Typical aryl groups include, but are not limited to, groups derived from aceanthrylene, acenaphthylene, acephenanthrylene, anthracene, azulene, benzene, chrysene, coronene, fluoranthene, fluorene, hexacene, hexaphene, hexalene, as-indacene, s-indacene, indane, indene, naphthalene, octacene, octaphene, octalene, ovalene, penta-2,4-diene, pentacene, pentalene, pentaphene, perylene, phenalene, phenanthrene, picene, pleiadene, pyrene, pyranthrene, rubicene, triphenylene, trinaphthalene, and the like. Particularly, an aryl group comprises from 6 to 14 carbon atoms.

"Aryloxy" refers to —O-aryl groups wherein "aryl" is as defined herein.

"Autoimmune disease" or "autoimmune condition" refers an illness that occurs when the body tissues are attacked by its own immune system. Examples of autoimuune disease or conditions include multiple sclerosis, ankylosing spondylitis, Crohn's disease, arthritis, psoriasis, Behçet's disease and psoriatic arthritis.

Azido" refers to the radical —N$_3$.

Boxplots refers to graphical rendition of statistical data based on the minimum, first quartile, median, third quartile, and maximum. The term "box plot" comes from the fact that the graph looks like a rectangle with lines extending from the top and bottom. In a typical box plot, the top of the rectangle indicates the third quartile, a horizontal line near the middle of the rectangle indicates the median, and the bottom of the rectangle indicates the first quartile. A vertical line extends from the top of the rectangle to indicate the maximum value, and another vertical line extends from the bottom of the rectangle to indicate the minimum value.

"Carbohydrate" means a mono-, di-, tri-, or polysaccharide, wherein the polysaccharide can have a molecular weight of up to about 20,000, for example, hydroxypropyl-methylcellulose or chitosan. "Carbohydrate" also encompasses oxidized, reduced or substituted saccharide mono-radical covalently attached to the anhydropyrimidine (e.g., anhydrothymidine or anhydrouridine), or derivative thereof any atom of the saccharide moiety, e.g., via the aglycone carbon atom. The "mono-, di-, tri-, or polysaccharide" can also include amino-containing saccharide groups. Representative "carbohydrate" include, by way of illustration, hexoses such as D-glucose, D-mannose, D-xylose, D-galactose, vancosamine, 3-desmethyl-vancosamine, 3-epi-vancosamine, 4-epi-vancosamine, acosamine, actinosamine, daunosamine, 3-epi-daunosamine, ristosamine, D-glucamine, N-methyl-D-glucamine, D-glucuronic acid, N-acetyl-D-glucosamine, N-acetyl-D-galactosamine, sialyic acid, iduronic acid, L-fucose, and the like; pentoses such as D-ribose or D-arabinose; ketoses such as D-ribulose or D-fructose; disaccharides such as 2-O-(α-L-vancosaminyl)-β-D-glucopyranose-, 2-O-(3-desmethyl-α-L-vancosaminyl)-ρ-D-glucopyranose, sucrose, lactose, or maltose; derivatives such as acetals, amines, acylated, sulfated and phosphorylated sugars; oligosaccharides having from 2 to 10 saccharide units. The saccharides can be either in their open, r pyranose or furanose forms.

"Carboxyl" refers to the radical —C(O)OH.

"Cyano" refers to the radical —CN.

"Cycloalkenyl" refers to cyclic hydrocarbyl groups having from 3 to 10 carbon atoms and having a single cyclic ring or multiple condensed rings, including fused and bridged ring systems and having at least one and particularly from 1 to 2 sites of olefinic unsaturation. Such cycloalkenyl groups include, by way of example, single ring structures such as cyclohexenyl, cyclopentenyl, cyclopropenyl, and the like.

"Cycloalkyl" refers to cyclic hydrocarbyl groups having from 3 to about 10 carbon atoms and having a single cyclic ring or multiple condensed rings, including fused and bridged ring systems, which optionally can be substituted with from 1 to 3 alkyl groups. Such cycloalkyl groups include, by way of example, single ring structures such as cyclopropyl, cyclobutyl, cyclopentyl, cyclooctyl, 1-methylcyclopropyl, 2-methylcyclopentyl, 2-methylcyclooctyl, and the like, and multiple ring structures such as adamantanyl, and the like.

"Heterocycloalkyl" refers to a stable heterocyclic non-aromatic ring and fused rings containing one or more heteroatoms independently selected from N, O and S. A fused heterocyclic ring system may include carbocyclic rings and need only include one heterocyclic ring. Examples of heterocyclic rings include, but are not limited to, piperazinyl, homopiperazinyl, piperidinyl and morpholinyl.

"Halo" or "halogen" refers to fluoro, chloro, bromo and iodo. Halo groups can be either fluoro or chloro.

"Hetero" when used to describe a compound or a group present on a compound means that one or more carbon atoms in the compound or group have been replaced by a nitrogen, oxygen, or sulfur heteroatom. Hetero may be applied to any of the hydrocarbyl groups described above such as alkyl, e.g, heteroalkyl, cycloalkyl, e.g., heterocycloalkyl, aryl, e.g., heteroaryl, cycloalkenyl, e.g., heterocycloalkenyl, cycloheteroalkenyl, e.g., heterocycloheteroalkenyl, and the like having from 1 to 5, and particularly from 1 to 3 heteroatoms. A heteroatom is any atom other than carbon or hydrogen and is typically, but not exclusively, nitrogen, oxygen, sulfur, phosphorus, boron, chlorine, bromine, or iodine. An unsubstituted heteroatom refers to a pendant heteroatom such as an amine, hydroxyl and thiol. A substituted heteroatom refers to a heteroatom that is other than a pendant heteroatom.

"Heteroaryl" refers to a monovalent heteroaromatic group derived by the removal of one hydrogen atom from a single atom of a parent heteroaromatic ring system. Typical heteroaryl groups include, but are not limited to, groups derived from acridine, arsindole, carbazole, β-carboline, chromane, chromene, cinnoline, furan, imidazole, indazole, indole, indoline, indolizine, isobenzofuran, isochromene, isoindole, isoindoline, isoquinoline, isothiazole, isoxazole, naphthyridine, oxadiazole, oxazole, perimidine, phenanthridine, phenanthroline, phenazine, phthalazine, pteridine, purine, pyran, pyrazine, pyrazole, pyridazine, pyridine, pyrimidine, pyrrole, pyrrolizine, quinazoline, quinoline, quinolizine, quinoxaline, tetrazole, thiadiazole, thiazole, thiophene, triazole, xanthene, and the like. The heteroaryl group can be a 5-20 membered heteroaryl, or 5-10 membered heteroaryl. Particular heteroaryl groups are those derived from thiophen, pyrrole, benzothiophene, benzofuran, indole, pyridine, quinoline, imidazole, oxazole and pyrazine.

"Hydroxyl" refers to the radical —OH.

"Nitro" refers to the radical —NO$_2$.

"Peptide" refers to a polyamino acid containing up to 2, 5, 10, or about 100 amino acid residues.

"Polypeptide" means polyamino acid containing from about 100 amino acid units to about 1,000 amino acid units, from about 100 amino acid units to about 750 amino acid units, or from about 100 amino acid units to about 500 amino acid units.

"Proliferative disease" or "proliferative condition" refers to a disease or condition featuring pathologic growth as an underlying pathology. Examples include cancer, arthritis and psoriasis.

"Side-effect" means an undesirable adverse consequence of drug administration such as mucositis associated with administration of radiation therapy.

"Stereoisomer" as it relates to a given compound is well understood in the art and refers to another compound having the same molecular formula, wherein the atoms making up the other compound differ in the way they are oriented in space, but wherein the atoms in the other compound are like the atoms in the given compound with respect to which atoms are joined to which other atoms (e.g., an enantiomer, a diastereomer, or a geometric isomer). See for example, Morrison and Boyd, Organic Chemistry, 1983, 4th ed., Allyn and Bacon, Inc., Boston, MA, p. 123.

"Substituted" refers to a group in which one or more hydrogen atoms are each independently replaced with the same or different substituent(s). "Substituted" groups particularly refer to groups having 1 or more substituents, for instance from 1 to 5 substituents, and particularly from 1 to 3 substituents, selected from the group consisting of acyl, acylamino, acyloxy, alkoxy, substituted alkoxy, alkoxycarbonyl, alkoxycarbonylamino, amino, substituted amino, aminocarbonyl, aminocarbonylamino, aminocarbonyloxy, aryl, aryloxy, aralkyl, azido, carboxyl, cyano, cycloalkyl, substituted cycloalkyl, halogen, hydroxyl, imidate, keto, nitro, thioalkoxy, substituted thioalkoxy, thioaryloxy, thioketo, thiol, alkylthio, (substituted alkyl) thio, arylthio, (substituted aryl) thio, alkyl-S(O)—, aryl-S(O)—, alkyl-S(O)$_2$— and aryl-S(O)$_2$. Typical substituents include, but are not limited to, —X, —R$^8$ (with the proviso that R$^8$ is not hydrogen), —O—, =O, —OR$^8$, —SR$^8$, —S$^-$, =S, —NR$^8$R$^9$, =NR$^8$, —CX$_3$, —CF$_3$, —CN, —OCN, —SCN, —NO, —NO$_2$, =N$_2$, —N$_3$, —S(O)$_2$O—, —S(O)$_2$OH, —S(O)$_2$R$^8$, —OS(O$_2$)O—, —OS(O)$_2$R$^8$, —P(O)(O$^-$)$_2$, —P(O)(OR$^8$)(O$^-$), —OP(O)(OR$^8$)(OR$^9$), —C(O)R$^8$, —C(S)R$^8$, —C(O)OR$^8$, —C(O)NR$^8$R$^9$, —C(O)O—, —C(S)OR$^8$, —NR$^{10}$C(O)NR$^8$R$^9$, —NR$^{10}$C(S)NR$^8$R$^9$, —NR$^{11}$C(NR$^{10}$)NR$^8$R$^9$ and —C(NR$^{10}$)NR$^8$R$^9$, where each X is independently a halogen.

"Substituted amino" includes those groups recited in the definition of "substituted" herein, and particularly refers to the group —N(R)$_2$ where each R is independently selected from the group consisting of hydrogen, alkyl, substituted alkyl, alkenyl, substituted alkenyl, alkynyl, substituted alkynyl, aryl, cycloalkyl, substituted cycloalkyl, and where both R groups are joined to form an alkylene group.

"Thioalkoxy" refers to the group —S-alkyl.

"Thioaryloxy" refers to the group —S-aryl.

"Thioketo" refers to the group =S.

"Thiol" refers to the group —SH.

TK-112690, a 2,2'-anhydropyrimidine radiation toxicity-reducing adjuvant according to an embodiment of the invention, as well as analogs of TK-112690, are authentic inhibitors of uridine phosphorylase, the enzyme that regulates the systemic concentration of uridine (Cao & Pizzorno, "Uridine phosphorylase an important enzyme in pyrimidine metabolism and fluoropyrimidine activation," Drugs Today Barcelona. (2004) 40: 431-43 and Pizzorno et al., "Homeostatic control of uridine and the role of uridine phosphorylase: a biological and clinical update," Biochim Biophys Acta. (2002) 1587: 133-44). Inhibition of uridine phosphorylase causes elevated uridine. Uridine is an endogenous biochemical which is known to protect in multiple animal models of human disease (Renck et al., "Human uridine phosphorylase-1 inhibitors: a new approach to ameliorate 5-fluorouracil-induced intestinal mucositis," Invest New Drugs. (2014) 32:1301-7; Jeengar et al., "Uridine Ameliorates Dextran Sulfate Sodium (DSS)-Induced Colitis in Mice," Sci Rep. (2017) 7:3924; Chenna et al., "Local but Not Systemic Administration of Uridine Prevents Development of Antigen-Induced Arthritis," PLoS One. (2015)10: e0141863; Oh et al., "Protective effect of uridine on cornea in a rabbit dry eye model," Invest Ophthalmol Vis Sci. (2007) 48:1102-9; Gongalves da Silva et al., "Therapeutic effect of uridine phosphorylase 1 (UPP1) inhibitor on liver fibrosis in vitro and in vivo," Eur J Pharmacol. (2020) 22 Oct. 2020:173670; Rozova et al., "Uridine supplementation exerts anti-inflammatory and anti-fibrotic effects in an animal model of pulmonary fibrosis," Sci Rep. (2019) 9: 9418; Cicko et al., "Uridine supplementation exerts anti-inflammatory and anti-fibrotic effects in an animal model of pulmonary fibrosis," Respir Res. (2015) 16:105; Cansev et al., "Neuroprotective effects of uridine in a rat model of neonatal hypoxic-ischemic encephalopathy," Neurosci Lett. (2013) 542: 65-70; Goren et al., "Uridine treatment protects against neonatal brain damage and long-term cognitive deficits caused by hyperoxia," Brain Res. (2017) 1676: 57-68; Wang et al., "Uridine treatment protects against neonatal brain damage and long-term cognitive deficits caused by hyperoxia," Brain Res. (2018) 1688:47-53; Venhoff et al., "Oral uridine supplementation antagonizes the peripheral neuropathy and encephalopathy induced by antiretroviral nucleoside analogues," AIDS. (2010) 24(3):345-52; Cansev et al., "Neuroprotective effects of uridine in a rat model of neonatal hypoxic-ischemic encephalopathy," Neurosci Lett. (2013) 542:65-70).

"Uridine phosphorylase" refers in enzymology to a phosphorylase (EC 2.4.2.3) that catalyzes the chemical reaction: uridine+phosphate→uracil+alpha-D-ribose 1-phosphate. The two substrates of this enzyme are uridine and phosphate, whereas its two products are uracil and alpha-D-ribose 1-phosphate. This enzyme belongs to the family of glycosyltransferases, specifically the pentosyltransferases. The systematic name of this enzyme class is uridine:phosphate alpha-D-ribosyltransferase. Other names in common use include pyrimidine phosphorylase, UrdPase, UPH, and UPase. This enzyme participates in pyrimidine metabolism.

"Uridine Supplement" refers to either a formulated product containing uridine or a formulated product containing a uridine precursor such as uridine monophosphate or acetylated uridine that converts to uridine in the body. The formulated product could be a solution, a capsule, a tablet or a cream. The product could be administered po, ip, sc, or iv. The uridine supplement could be administered as part of a more complex mixture such as a nutritional supplement.

Miscellaneous definitions are as follows. Gy is an abbreviation for Gray, a unit of radiation. TBI mean total body irradiation. i.p., p.o and s.c refer to intraperitoneal (i.p.), oral (p.o.) or subcutaneous (s.c.) dosing. H&E refers to Haematoxylin & Eosin, a dye used to stain tissues. SD is standard deviation and SE is standard error. PBS is phosphate buffered saline. q.d. and b.i.d refer to once a day and twice-a-day, respectfully.

One having ordinary skill in the art will recognize that the maximum number of heteroatoms in a stable, chemically feasible heterocyclic ring, whether it is aromatic or non-aromatic, is determined by the size of the ring, the degree of unsaturation and the valence of the heteroatoms. In general, a heterocyclic ring may have one to four heteroatoms so long as the heteroaromatic ring is chemically feasible and stable.

DETAILED DESCRIPTION

Methods for reducing radiation therapy induced toxicity, e.g., mucositis, in a subject are provided. Aspects of the methods include administering an effective amount of a radiation toxicity-reducing adjuvant to the subject. In certain embodiments, the radiation toxicity-reducing adjuvant is a 2,2'-anhydropyrimidine, or a derivative thereof. Also provided are compositions for use in practicing the subject methods. The subject methods and compositions find use in a variety of different applications, including the treatment of a variety of different disease conditions.

Of particular interest is the use of anhydronucleosides as adjuvants to ameliorate the toxic side-effects of radiation therapy, as well as compositions for practicing the subject methods and other applications. Anhydronucleosides are analogs of natural nucleosides, often finding use as intermediates in the synthesis of nucleoside derivatives. They are characterized by having, in addition to the N-glycoside linkage, a covalent linkage either directly or via bridging atoms between the 2', 3', or 5' carbons of the sugar and a carbon, oxygen or nitrogen atom (other than the nitrogen of the glycoside bond) of the base. The anhydropyrimidines are characterized by a pyrimidine base that is covalently linked either directly or via bridging atoms between the 2', 3', or 5' carbons of the sugar and a carbon, oxygen or nitrogen atom (other than the nitrogen of the glycoside bond) of the pyrimidine base. The radiation toxicity-reducing adjuvant 2,2'-anhydropyrimidine and derivatives thereof are of specific interest.

Before the present invention is described in greater detail, it is to be understood that this invention is not limited to particular embodiments described, as such may, of course, vary. It is also to be understood that the terminology used herein is for the purpose of describing particular embodiments only, and is not intended to be limiting, since the scope of the present invention will be limited only by the appended claims.

Where a range of values is provided, it is understood that each intervening value, to the tenth of the unit of the lower limit, unless the context clearly dictates otherwise, between the upper and lower limit of that range and any other stated or intervening value in that stated range, is encompassed within the invention. The upper and lower limits of these smaller ranges may independently be included in the smaller ranges and are also encompassed within the invention, subject to any specifically excluded limit in the stated range.

Where the stated range includes one or both of the limits, ranges excluding either or both of those included limits are also included in the invention.

Certain ranges are presented herein with numerical values being preceded by the term "about." The term "about" is used herein to provide literal support for the exact number that it precedes, as well as a number that is near to or approximately the number that the term precedes. In determining whether a number is near to or approximately a specifically recited number, the near or approximating unrecited number may be a number which, in the context in which it is presented, provides the substantial equivalent of the specifically recited number.

Unless defined otherwise, all technical and scientific terms used herein have the same meaning as commonly understood by one of ordinary skill in the art to which this invention belongs. Although any methods and materials similar or equivalent to those described herein can also be used in the practice or testing of the present invention, representative illustrative methods and materials are now described.

All publications and patents cited in this specification are herein incorporated by reference as if each individual publication or patent were specifically and individually indicated to be incorporated by reference and are incorporated herein by reference to disclose and describe the methods and/or materials in connection with which the publications are cited. The citation of any publication is for its disclosure prior to the filing date and should not be construed as an admission that the present invention is not entitled to antedate such publication by virtue of prior invention. Further, the dates of publication provided may be different from the actual publication dates which may need to be independently confirmed.

It is noted that, as used herein and in the appended claims, the singular forms "a", "an", and "the" include plural referents unless the context clearly dictates otherwise. It is further noted that the claims may be drafted to exclude any optional element. As such, this statement is intended to serve as antecedent basis for use of such exclusive terminology as "solely," "only," and the like in connection with the recitation of claim elements, or use of a "negative" limitation.

As will be apparent to those of skill in the art upon reading this disclosure, each of the individual embodiments described and illustrated herein has discrete components and features which may be readily separated from or combined with the features of any of the other several embodiments without departing from the scope or spirit of the present invention. Any recited method can be carried out in the order of events recited or in any other order that is logically possible.

While the method has or will be described for the sake of grammatical fluidity with functional explanations, it is to be expressly understood that the claims, unless expressly formulated under 35 U.S.C. § 112, are not to be construed as necessarily limited in any way by the construction of "means" or "steps" limitations, but are to be accorded the full scope of the meaning and equivalents of the definition provided by the claims under the judicial doctrine of equivalents, and in the case where the claims are expressly formulated under 35 U.S.C. § 112 are to be accorded full statutory equivalents under 35 U.S.C. § 112.

Methods

As summarized above, methods of reducing radiation therapy induced toxicity in a subject are provided. Aspects of the methods include administering radiation therapy to the subject in combination with a radiation toxicity-reducing adjuvant. In certain embodiments, the radiation toxicity-reducing adjuvant is a 2,2'-anhydropyrimidine, such as a 2,2'-anhydrouridine or analogue/derivative thereof. By "in combination with", is meant that an amount of the radiation toxicity-reducing adjuvant is administered anywhere from simultaneously to up to 5 hours, or more, e.g., 10 hours, 15 hours, 20 hours, or more, prior to, or after, the radiation therapy. In certain embodiments, the radiation therapy and radiation toxicity reducing adjuvant are administered sequentially, e.g., where the radiation therapy is administered before or after the radiation toxicity-reducing adjuvant. In yet other embodiments, the radiation therapy and radiation toxicity-reducing adjuvant are administered simultaneously. Regardless of whether the radiation therapy and radiation toxicity-reducing adjuvant are administered sequentially or simultaneously, as illustrated above, or any effective variation thereof, the therapy and adjuvant are considered to be administered together or in combination for purposes of the present invention.

In the subject methods, radiation therapy is administered to a subject in need thereof in combination with an effective amount of a radiation toxicity-reducing adjuvant. By "radiation therapy", also known in the art as "radiotherapy", is meant the delivery of high-energy radiation to damage and/or kill cancer cells and to shrink tumors or for other purposes. The high-energy radiation may involve x-rays, gamma rays, or charged particles. The radiation therapy may be delivered by a machine positioned outside of the body (external-beam radiation therapy), or it may come from radioactive material placed in the body near cancer cells (internal radiation therapy, also called brachytherapy). Systemic radiation therapy uses radioactive substances, such as radioactive iodine, that travel in the blood to kill cancer cells. Accordingly, in one embodiment, radiotherapy intends external radiotherapy where the radiation comes from an instrument outside the body. External radiotherapy is usually given as a course of several treatments over days or weeks and during a treatment a machine directs the high-energy radiation, usually X-rays, at the cancer site and a small area of normal tissue surrounding it. In another embodiment, radiotherapy intends internal radiotherapy where the radiation comes from an implant or a material (liquid, solid, semi-solid or other substance) placed inside the body. In one embodiment, the internal radiotherapy is brachytherapy where a solid radioactive source is placed inside a body cavity or needles are placed in the tumor. In another embodiment, the internal radiotherapy comprises administering a liquid source of radiation, such as a radionuclide (radioisotope or unsealed source). The radiation source may be orally administered or may be injected into a vein.

The phrase "radiation toxicity-reducing adjuvant" refers to an agent that reduces toxicity of a given radiation therapy. Radiation toxicity-reducing adjuvants of interest are those agents that reduce the toxicity of a radiation therapy by 2 to 10-fold or more, such as by 50-fold or more, and including by 100-fold or more, e.g., as determined using the assay described in the Experimental section, below. In certain embodiments, the radiation toxicity-reducing adjuvants employed in methods of the invention are those that reduce the occurrence and/or intensity of observable toxic side-effects of a given radiation therapy, as observed in the mouse assay described in the Experimental section below. Aspects of toxicity-reducing adjuvants according to certain embodiments of the invention are that the adjuvants do not substantially reduce, and in certain embodiments have no impact at all, on the desired therapeutic activity of the radiation therapy, e.g., as determined using the protocol described in the Experimental section below.

In some embodiments, the radiation toxicity-reducing adjuvants of interest are 2,2'-anhydropyrimidines and derivatives thereof. In some embodiments, the 2,2'-anhydropyrimidine or derivative thereof is a compound of formula (I):

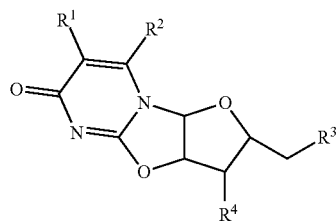

or the pharmaceutically acceptable salts, solvates, hydrates, and prodrug forms thereof, and stereoisomers thereof; wherein:

each $R^1$, $R^2$, $R^3$ and $R^4$ is independently selected from the group consisting of hydrogen, substituted or unsubstituted heteroatom, substituted or unsubstituted alkyl, substituted or unsubstituted cycloalkyl, substituted or unsubstituted heterocycloalkyl, substituted or unsubstituted aryl, substituted or unsubstituted heteroaryl, substituted or unsubstituted aralkyl, hydroxyl, halogen, azido, amino, substituted amino, carbohydrate, nucleic acid, amino acid, peptide, dye, fluorophore, and polypeptide.

In certain embodiments, the compound is of formula (I), $R^1$, $R^2$, $R^3$ and $R^4$ are independently hydrogen, hydroxyl, heteroatom, $C_1$-$C_{18}$ alkyl, $C_1$-$C_{18}$ substituted alkyl, $C_1$-$C_{18}$ alkenyl, $C_1$-$C_{18}$ acyl, amino, substituted amino, wherein the alkyl, alkenyl or acyl is linear or branched, and optionally substituted with a hydroxyl, an ester and its derivatives, a carboxyl and its derivatives, a cycloalkyl, a heterocycloalkyl, an aryl, a heteroaryl, an aralkyl, a heteroatom, and possibly containing in chain or bridging heteroatoms such as nitrogen, oxygen and sulfur.

Examples of $R^1$ constituents of interest include, but are not limited to: hydrogen; hydroxyl; sulfyhydryl; halogen such as fluorine, chlorine, bromine or iodine, as well as pseudohalogen such as a lower alkylsulfonyl group of 1 to 5 carbons such as methyl-, ethyl-, propyl-, isopropyl-, butyl-, isobutyl-, tert-butyl-, and pentasulfonyl or arylsulfonyl such as benzene, p-toluene, p-nitrobenzenesulfonyl groups; lower alkyl containing 1 to 20 carbons such as methyl, ethyl, propyl, isopropyl, butyl, isobutyl, tert-butyl, pentyl and the like, including substituted lower alkyl such as aminomethyl, hydroxymethyl, methoxy, ethyloxy, propyloxy, benzyloxy, imidate, alkylthio, (substituted alkyl)thio, arylthio, (substituted aryl)thio and the like; lower alkenyl containing 1 to 20 carbons such as vinyl and substituted vinyl, ethynyl and substituted ethynyl, where the substituted vinyl or substituted ethynyl designates substitution of the $ position of vinyl or ethynyl by a halogen such as bromine, chlorine, fluorine or iodine, or substitution by an alkyl of 1 to 5 carbon atoms such as methyl, ethyl, propyl, butyl, pentyl and the like, or aralkyl such as benzyl, p-chlorobenzyl, p-nitrobenzyl and the like, or aryl such as phenyl, p-nitrophenyl, p-tolyl, p-anisyl, naphtyl and the like; lower alkanoyl (acyl groups) containing 1 to 20 carbons such as formyl, acetyl, propionyl, isopropionyl, butyryl, isobutyryl, tert-butyryl, valeryl, pivaloyl, caproyl, capryl, lauryl, myristyl, palmityl, stearyl, arachidyl, stilligyl, palmitoyl, oleyl, linolenyl, arachidonyl and the like; lower aryl containing 1 to 20 carbons such as phenyl, p-tolyl, p-chlorophenyl, p-aminophenyl, p-nitrophenyl, p-anisyl and the like; lower aroyl containing 1 to 20 carbons such as benzoyl and naphthoyl, where the aromatic group may be additionally substituted by alkyl, alkoxy, halo, or nitro moieties such as p-tolnoyl, p-anisoyl, p-chlorobenzoyl, p-nitrobenzoyl or 2,4-dinitrobenzoyl, pentafluorobenzoyl and the like, or another aroyl such as benzyloxybenzoyl and the like; lower aralkyl containing 1 to 20 carbons such as benzyl, benzhydryl, p-chlorobenzyl, m-chlorobenzyl, p-nitrobenzyl, benzyloxybenzyl, pentaflourobenzyl and the like; amino or alkylamino containing 1 to 20 carbons such as a monoalkyl- or monoaralkylamino groups like methylamino, ethylamino, propylamino or benzylamino and the like, dialkylamino such as dimethylamino, diethylamino, dibenzylamino, pyrrolidino, piperidino or molpholino and the like.

Thus, in certain embodiments, $R^1$ is hydrogen, hydroxyl, sulfyhydryl, amino, substituted amino, hydroxymethyl, monomethoxy, halogen, pseudohalogen, or a lower hydrocarbon (which hydrocarbon can be substituted or unsubstituted) containing from 1 to 20 atoms. In a particular embodiment, $R^1$ is a lower hydrocarbon selected from alkyl, substituted alkyl, alkenyl, alkanoyl, aryl, aroyl, aralkyl, or alkylamino. In a particular embodiment, $R^1$ is a lower hydrocarbon substituted with alkoxy, substituted alkoxy, imidate, arylthio, or (substituted aryl)thio. In other embodiments, $R^1$ is a lower alkyl selected from methyl, ethyl, propyl, isopropyl, butyl, isobutyl, tert-butyl and pentyl. In other embodiments, $R^1$ is a lower alkenyl selected from vinyl, substituted vinyl, ethynyl, or substituted ethynyl. In other embodiments, $R^1$ is a lower alkanoyl selected from formyl, acetyl, propionyl, isopropionyl, butyryl, isobutyryl, tert-butyryl, valeryl, pivaloyl, caproyl, capryl, lauryl, myristyl, palmityl, stearyl, arachidyl, stilligyl, palmitoyl, oleyl, linolenyl, and arachidonyl. In other embodiments, $R^1$ is lower aryl selected from phenyl, p-tolyl, p-chlorophenyl, p-aminophenyl, p-nitrophenyl, p-anisyl. In yet other embodiments, $R^1$ is a lower aroyl selected from benzoyl and naphthoyl. In other embodiments, $R^1$ is a lower aralkyl selected from benzyl, benzhydryl, p-chlorobenzyl, m-chlorobenzyl, p-nitrobenzyl, benzyloxybenzyl, or pentaflourobenzyl. In certain other embodiments, $R^1$ is a lower alkylamino is selected from monoalkylamino, monoaralkylamino, dialkylamino, diaralkylamino, and benzylamino.

Compounds of interest include, but are not limited to, those of formula (I) where $R^1$ is selected from hydrogen, fluorine, trifluoromethyl, methyl, ethyl, propyl, butyl, isopropyl, isobutyl, acetyl, propionyl, butyryl, 2-bromovinyl, phenyl, benzyl, benzoyl, benzyloxybenzyl, benzylamino, alkyloxyalkyl, benzyloxyalkyl, imidatealkyl, arylthio, and (substituted aryl)thio. Thus, in certain embodiments, the compound is of formula (I), and $R^1$ is H, F, $CF_3$, $CH_3$, $CH_3CH_2$, $CH_3CH_2CH_2$, $(CH_3)_2CH$, $(CH_3)_2CH_2CH_2$, $CH_3(O)CCH_2$, $CH_3(O)CCH_2CH_2$, Br—CH=CH, phenyl, benzyl, benzoyl, benzyloxybenzyl, benzyl-NH—, $CH_3CH_2OCH_2$, benzyl-O—$CH_2$, $CH_3OCH_2$, $CH_3C(NH)$—O—$CH_2$, or $CH_3$-phenyl-O—$CH_2$.

Examples of $R^2$ constituents of interest include, but are not limited to: hydrogen; hydroxyl; sulfyhydryl; halogen such as fluorine, chlorine, bromine or iodine, as well as pseudohalogen such as a lower alkylsulfonyl group of 1 to 5 carbons such as methyl-, ethyl-, propyl-, isopropyl-, butyl-, isobutyl-, tert-butyl-, and pentasulfonyl or arylsulfonyl such as benzene, p-toluene, p-nitrobenzenesulfonyl groups; lower alkyl containing 1 to 20 carbons such as methyl, ethyl, propyl, isopropyl, butyl, isobutyl, tert-butyl, pentyl and the like, including substituted lower alkyl such as aminomethyl, hydroxymethyl, methoxy, ethyloxy, propyloxy, and the like; lower alkenyl containing 1 to 20 carbons such as vinyl and substituted vinyl, ethynyl and substituted ethynyl, where the substituted vinyl or substituted ethynyl designates substitution of the B position of vinyl or ethynyl by a halogen such as bromine, chlorine, fluorine or iodine, or substitution by an alkyl of 1 to 5 carbon atoms such as methyl, ethyl, propyl, butyl, pentyl and the like, or aralkyl such as benzyl, p-chlorobenzyl, p-nitrobenzyl and the like, or aryl such as phenyl, p-nitrophenyl, p-tolyl, p-anisyl, naphtyl and the like; lower alkanoyl (acyl groups) and esters thereof of a main chain containing 1 to 20 carbons such as formyl, acetyl, propionyl, isopropionyl, butyryl, isobutyryl, tert-butyryl, valeryl, pivaloyl, caproyl, capryl, lauryl, myristyl, palmityl, stearyl, arachidyl, stilligyl, palmitoyl, oleyl, linolenyl, arachidonyl and the like; lower aryl containing 1 to 20 carbons such as phenyl, p-tolyl, p-chlorophenyl, p-aminophenyl, p-nitrophenyl, p-anisyl and the like; lower aroyl containing 1 to 20 carbons such as benzoyl and naphthoyl, where the aromatic group may be additionally substituted by alkyl, alkoxy, halo, or nitro moieties such as p-tolnoyl, p-anisoyl, p-chlorobenzoyl, p-nitrobenzoyl or 2,4-dinitrobenzoyl, pentafluorobenzoyl and the like, or another aroyl such as benzyloxybenzoyl and the like; lower aralkyl containing 1 to 20 carbons such as benzyl, benzhydryl, p-chlorobenzyl, m-chlorobenzyl, p-nitrobenzyl, benzyloxybenzyl, pentaflourobenzyl and the like; lower aryloxy containing 1 to 20 carbons such as phenyloxy (i.e., 0-phenyl), benzyloxy (i.e., O-benzyl), benzhydryloxy (i.e., O-benzylhydryl), p-chlorobenzyloxy (i.e., O-(p-chlorobenzyl)), m-chlorobenzyloxy (i.e., O-(m-chlorobenzyl)), p-nitrobenzyloxy (i.e., O-(p-nitrobenzyl)), (4-benzyloxybenzyl)-oxy (i.e., O-benzyloxybenzyl), or pentaflourobenzyloxy (i.e., O-pentaflourobenzyl); esters of aryloxys, such as lower aroyloxy (i.e., O-aroyl) containing 1 to 20 carbons such as benzoyloxy (i.e., O-benzoyl), diphenylacetyloxy (i.e., O-diphenylacetyl), p-chlorobenzoyloxy (i.e., O-(p-chlorobenzoyl)), m-chlorobenzoyloxy (i.e., O-(m-chlorobenzoyl)), p-nitrobenzoyloxy (i.e., O-(p-nitrobenzoyl)), (4-benzyloxybenzoyl)-oxy (i.e., O-benzyloxybenzoyl), or pentaflourobenzoyloxy (i.e., O-pentaflourobenzoyl); amino or alkylamino containing 1 to 20 carbons such as a monoalkyl- or monoaralkylamino groups like methylamino, ethylamino, propylamino or benzylamino and the like, dialkylamino such as dimethylamino, diethylamino, dibenzylamino, pyrrolidino, piperidino or molpholino and the like.

Thus, in certain embodiments, $R^2$ is hydrogen, hydroxyl, sulfyhydryl, amino, hydroxymethyl, monomethoxy, halogen, pseudohalogen, or a lower hydrocarbon (which hydrocarbon can be substituted or unsubstituted) containing from 1 to 20 atoms, and esters thereof. In a particular embodiment, $R^2$ is a lower hydrocarbon selected from alkyl, alkenyl, alkanoyl, aryl, aroyl, aryloxy, aroyloxy, aralkyl, or alkylamino. In other embodiments, $R^2$ is a lower alkyl selected from methyl, ethyl, propyl, isopropyl, butyl, isobutyl, tert-butyl and pentyl. In other embodiments, $R^2$ is a lower alkenyl selected from vinyl, substituted vinyl, ethynyl, or substituted ethynyl. In other embodiments, $R^2$ is a lower alkanoyl selected from formyl, acetyl, propionyl, isopropionyl, butyryl, isobutyryl, tert-butyryl, valeryl, pivaloyl, caproyl, capryl, lauryl, myristyl, palmityl, stearyl, arachidyl, stilligyl, palmitoyl, oleyl, linolenyl, and arachidonyl. In other embodiments, $R^2$ is lower aryl selected from phenyl, p-tolyl, p-chlorophenyl, p-aminophenyl, p-nitrophenyl, p-anisyl. In yet other embodiments, $R^2$ is a lower aroyl selected from benzoyl and naphthoyl. In other embodiments, $R^2$ is a lower aralkyl selected from benzyl, benzhydryl, p-chlorobenzyl, m-chlorobenzyl, p-nitrobenzyl, benzyloxybenzyl, or pentaflourobenzyl. In other embodiments, $R^2$ is a lower aryloxy selected from phenyloxy, benzyloxy, benzhydryloxy, p-chlorobenzyloxy, m-chlorobenzyloxy, p-nitrobenzyloxy, (4-benzyloxybenzyl)-oxy, or pentaflourobenzyloxy. In other embodiments, $R^2$ is a lower aroyloxy selected from benzoyloxy, diphenylacetyloxy, p-chlorobenzoyloxy, m-chlorobenzoyloxy, p-nitrobenzoyloxy, (4-benzyloxybenzoyl)-oxy, or pentaflourobenzoyloxy. In certain other embodiments, $R^2$ is a lower alkylamino is selected from monoalkylamino, monoaralkylamino, dialkylamino, and diaralkylamino. Thus, in certain embodiments, $R^2$ can not only be hydrogen or hydroxyl, but also an O-acyl, alkoxy, alkoxycarbonyl, alkoxycarbonylamino, O-alkyl, O-alkylene, O-alkynyl, O-aralkyl, O-aryl, O-aryloxy, O-carbohydrate, O-cycloalkenyl, O-cycloalkyl, O-heterocycloalkyl, O-heteroaryl. In addition, an S can substitute for the O.

Compounds of interest include, but are not limited to, those of formula (I) where $R^2$ is selected from hydrogen, fluorine, trifluoromethyl, methyl, ethyl, propyl, butyl, isopropyl, isobutyl, acetyl, propionyl, butyryl, 2-bromovinyl, phenyl, phenyloxy, benzyl, benzoyl, benzoyloxy and benzyloxybenzyl. Thus, in certain embodiments, the compound is of formula (I), and $R^2$ is H, F, $CF_3$, $CH_3$, $CH_3CH_2$, $CH_3CH_2CH_2$, $(CH_3)_2CH$, $(CH_3)_2CH_2CH_2$, $CH_3(O)CCH_2$, $CH_3(O)CCH_2CH_2$, Br—CH═CH, phenyl, phenyloxy, benzyl, benzoyl, benzoyloxy, or benzyloxybenzyl.

In specific embodiments of interest, the compound is of formula (I), and $R^2$ is hydrogen, hydroxyl, or an O-linked substituent. This includes compounds of formula (I), where $R^2$ is H, OH or $C_6H_5C(O)O$.

Examples of $R^3$ of interest include, but are not limited to: hydrogen; hydroxyl; azido; sulfyhydryl; halogen; pseudohalogen; lower alkyl containing 1 to 20 carbons such as methyl, ethyl, propyl, isopropyl, butyl, isobutyl, tert-butyl, pentyl and the like, including a substituted lower alkyl such as aminomethyl, hydroxymethyl, methoxy, ethyloxy, propyloxy, and the like; lower alkanoyl (acyl) including esters thereof of a main chain of 1 to 20 carbon atoms such as formyl, acetyl, propionyl, isopropionyl, butyryl, isobutyryl, tert-butyryl, valeryl, pivaloyl, caproyl, capryl, lauryl, myristyl, palmityl, stearyl, arachidyl, stilligyl, palmitoyl, oleyl, linolenyl, arachidonyl and the like; lower aryl such as phenyl, p-nitrophenyl, p-tolyl, p-anisyl, naphtyl and the like; lower aroyl (acyl radical of an aromatic acid) of 1 to 20 carbons such as benzoyl and naphthoyl, where the aromatic group may be additionally substituted by alkyl, alkoxy, halo, or nitro moieties such as p-tolnoyl, p-anisoyl, p-chlorobenzoyl, p-nitrobenzoyl or 2,4-dinitrobenzoyl, pentafluorobenzoyl and the like; lower aryloxy of 1 to 20 carbons such as phenyloxy, benzyloxy, benzhydryloxy, p-chlorobenzyloxy, m-chlorobenzyloxy, p-nitrobenzyloxy, (4-benzyloxybenzyl)-oxy, or pentaflourobenzyloxy and the like; as well as esters of aryloxys, such as lower aroyloxy (O-aroyls) of 1 to 20 carbons such as benzoyloxy, diphenylacetyloxy, p-chlorobenzoyloxy, m-chlorobenzoyloxy, p-nitrobenzoyloxy, (4-benzyloxybenzoyl)-oxy, or pentaflourobenzoyloxy and the like. $R^3$ may also be adamantoyl, or substituted adamantoyl.

Thus, in certain embodiments, $R^3$ is hydrogen, hydroxyl, azido, sulfyhydryl, hydroxymethyl, halogen, or pseudohalogen. In other embodiments, $R^3$ is a lower hydrocarbon selected from alkyl, alkanoyl, aryl, aroyl, aryloxy, aroyloxy, or aralkyl. In other embodiments, $R^3$ is a lower alkyl selected from methyl, ethyl, propyl, isopropyl, butyl, isobutyl, tert-butyl and pentyl. In other embodiments, $R^3$ is a lower alkanoyl selected from formyl, acetyl, propionyl, isopropionyl, butyryl, isobutyryl, tert-butyryl, valeryl, pivaloyl, caproyl, capryl, lauryl, myristyl, palmityl, stearyl, arachidyl, stilligyl, palmitoyl, oleyl, linolenyl, and arachidonyl. In other embodiments, $R^3$ is a lower aryl selected from phenyl, p-tolyl, p-chlorophenyl, p-aminophenyl, p-nitrophenyl, p-anisyl and the like. In other embodiments, $R^3$ is a lower aroyl selected from benzoyl and naphthoyl. In yet other certain embodiments, $R^3$ is a lower aralkyl selected from benzyl, benzhydryl, p-chlorobenzyl, m-chlorobenzyl, p-nitrobenzyl, benzyloxybenzyl, or pentaflourobenzyl. In other embodiments, $R^3$ is a lower aryloxy selected from phenyloxy, benzyloxy, benzhydryloxy, p-chlorobenzyloxy, m-chlorobenzyloxy, p-nitrobenzyloxy, (4-benzyloxybenzyl)-oxy, or pentaflourobenzyloxy. In other embodiments, $R^3$ is a lower aroyloxy selected from benzoyloxy, diphenylacetyloxy, p-chlorobenzoyloxy, m-chlorobenzoyloxy, p-nitrobenzoyloxy, (4-benzyloxybenzoyl)-oxy, or pentaflourobenzoyloxy. Thus, in certain embodiments, $R^3$ can not only be hydrogen or hydroxyl, but also an O-acyl, alkoxy, alkoxycarbonyl, alkoxycarbonylamino, O-alkyl, O-alkylene, O-alkynyl, O-aralkyl, O-aryl, O-aryloxy, O-carbohydrate, O-cycloalkenyl, O-cycloalkyl, O-heterocycloalkyl, O-heteroaryl. In addition, an S can substitute for the O.

Compounds of interest are those of formula (I) where $R^3$ is hydrogen, hydroxyl, halogen, azido, or an O-linked substituent. This includes compounds of formula (I) where $R^3$ is selected from hydrogen, hydroxyl, n-butoxy, isobutyloxy, t-butyloxy, phenyloxy, benzyloxy, benzoyloxy, and pentafluorobenzoyloxy. Thus, in certain embodiments, the compound is of formula (I), and $R^3$ is selected from H, OH, $CH_3CH_2CH_2CH_2O$, $(CH_3)_2CH_2CH_2O$, $(CH_3)_3CO$, $C_6H_5O$, benzoyloxy, and pentafluorobenzoyloxy.

In specific embodiments of interest, the compound is of formula (I), where $R^3$ is H, OH, F, Cl, Br, I, $N_3$, or $C_6H_5C(O)O$. Of special interest is a compound of formula (I), where $R^3$ is OH, or O-acyl (for example, an ester such as $C_6H_5C(O)O$).

Examples of $R^4$ include but are not limited to: hydrogen; hydroxyl; sulfhydryl; halogen such as fluorine, chlorine, bromine or iodine; amino or lower alkylamino. $R^4$ also is exemplified by lower alkyl, with acyl groups which may be lower alkanoyl groups of 1 to 7 carbon atoms such as formyl, acetyl, propionyl, isopropionyl, butyryl, isobutyryl, tert-butyryl and the like, and esters thereof. Thus, $R^4$ can also be aroyl (and esters thereof such as O-linked aroyls, i.e., O-arolys or arolyoxy) such as benzoyl and naphthoyl wherein the aromatic group may be additionally substituted by alkyl, alkoxy, halo, or nitro moieties such as p-tolnoyl, p-anisoyl, p-chlorobenzoyl, p-nitrobenzoyl or 2,4-dinitrobenzoyl and the like. Accordingly, in certain embodiments, $R^4$ can not only be hydrogen or hydroxyl, but also an O-acyl, alkoxy, alkoxycarbonyl, alkoxycarbonylamino, O-alkyl, O-alkylene, O-alkynyl, O-aralkyl, O-aryl, O-aryloxy, O-carbohydrate, O-cycloalkenyl, O-cycloalkyl, O-heterocycloalkyl, O-heteroaryl. In addition, an S can substitute for the O.

Thus, in certain embodiments, $R^4$ is hydrogen; hydroxyl; sulfhydryl; halogen, amino aminomethyl, or aminodimethyl. In other embodiments, $R^4$ is a lower alkyl, acyl, aroyl, or aroyloxy. This includes a specific embodiment, where the compound of formula (I) is one where $R^4$ is hydrogen, flourine, hydroxyl, amino, aminomethyl, aminodimethyl, t-butyloxy, phenyloxy or benzoyloxy (for example, a compound of formula (I), where $R^4$ is H, F, OH, $NH_2$, $NHCH_3$, $N(CH_3)_2$, $(CH_3)_3CO$, $C_6H_5O$ or $C_6H_5C(O)O$).

Compounds of particular interest are those of formula (I) where $R^4$ is hydrogen, hydroxyl, or an O-linked substituent. In specific embodiments, the compound is of formula (I), where $R^4$ is H, OH or $C_6H_5C(O)O$. Of special interest is a compound of formula (I), where $R^4$ is OH, or O-acyl (for example, an ester such as $C_6H_5C(O)O$).

Of interest are compounds of formula (I) where: $R^1$ is H, F, $CF_3$, $CH_3$, $CH_3CH_2$, $CH_3CH_2CH_2$, $(CH_3)_2CH$, $(CH_3)_2CH_2CH_2$, $CH_3(O)CCH_2$, $CH_3(O)CCH_2CH_2$, Br—CH=CH, phenyl, benzyl, benzoyl, or benzyloxybenzyl, $R^2$ is H, OH, F, $CF_3$, $CH_3$, $CH_3CH_2$, $CH_3CH_2CH_2$, $(CH_3)_2CH$, $(CH_3)_2CH_2CH_2$, $CH_3(O)CCH_2$, $CH_3(O)CCH_2CH_2$, Br—CH=CH, phenyl, phenyloxy, benzyl, benzoyl, benzoyloxy, or benzyloxybenzyl, and where $R^3$ and $R^4$ are each hydroxyl. These include the compounds: 2,2'-anhydrouridine; 2,2'-anhydro-5-fluorouridine; 2,2'-anhydro-5-trifluoromethyluridine; 2,2'-anhydro-5-methyluridine; 2,2'-anhydro-5-ethyluridine; 2,2'-anhydro-5-propyluridine; 2,2'-anhydro-5-isopropyluridine; 2,2'-anhydro-5-isobutyluridine; 2,2'-anhydro-5-methylacyluridine; 2,2'-anhydro-5-propylacyluridine; 2,2'-anhydro-5-(2-bromovinyl)-uridine; 2,2'-anhydro-5-phenylluridine; 2,2'-anhydro-5-benzyluridine; 2,2'-anhydro-5-benzyoluridine; and 2,2'-anhydro-5-(benzyloxybenzyl)-uridine. Of special interest is 2,2'-anhydro-5-methyluridine, or the pharmaceutically acceptable salts, solvates, hydrates, and prodrug forms thereof, and stereoisomers thereof.

Additional compounds of interest are compounds of formula (I) where: $R^1$ is H, F, $CF_3$, $CH_3$, $CH_3CH_2$, $CH_3CH_2CH_2$, $(CH_3)_2CH$, $(CH_3)_2CH_2CH_2$, $CH_3(O)CCH_2$, $CH_3(O)CCH_2CH_2$, Br—CH=CH, phenyl, benzyl, benzoyl, or benzyloxybenzyl, $R^2$ is H, OH, F, $CF_3$, $CH_3$, $CH_3CH_2$, $CH_3CH_2CH_2$, $(CH_3)_2CH$, $(CH_3)_2CH_2CH_2$, $CH_3(O)CCH_2$, $CH_3(O)CCH_2CH_2$, Br—CH=CH, phenyl, phenyloxy, benzyl, benzyloxy, benzoyl, benzoyloxy, or benzyloxybenzyl, and where $R^3$ is hydroxyl, and $R^4$ is benzoyloxy. These include the compounds: 3'-O-benzoyl-2,2'-anhydrouridine; 3'-O-benzoyl-2,2'-anhydro-5-fluorouridine; 3'-O-benzoyl-2,2'-anhydro-5-trifluoromethyluridine; 3'-O-benzoyl-2,2'-anhydro-5-methyluridine; 3'-O-benzoyl-2,2'-anhydro-5-ethyluridine; 3'-O-benzoyl-2,2'-anhydro-5-propyluridine; 3'-O-benzoyl-2,2'-anhydro-5-isopropyluridine; 3'-O-benzoyl-2,2'-O-anhydro-5-isobutyluridine; 3'-O-benzoyl-2,2'-anhydro-5-methylacyluridine; 3'-O-benzoyl-2,2'-anhydro-5-propylacyluridine; 3'-O-benzoyl-2,2'-anhydro-5-(2-bromovinyl)-uridine; 3'-O-benzoyl-2,2'-anhydro-5-phenylluridine; 3'-O-benzoyl-2,2'-anhydro-5-benzyluridine; 3'-O-benzoyl-2,2'-anhydro-5-benzyoluridine; and 3'-O-benzoyl-2,2'-anhydro-5-(benzyloxybenzyl)-uridine. Of specific interest is 3'-O-benzoyl-2,2'-anhydro-5-methyluridine, or the pharmaceutically acceptable salts, solvates, hydrates, and prodrug forms thereof, and stereoisomers thereof.

Also of interest are compounds of formula (I) where: $R^1$ is H, F, $CF_3$, $CH_3$, $CH_3CH_2$, $CH_3CH_2CH_2$, $(CH_3)_2CH$, $(CH_3)_2CH_2CH_2$, $CH_3(O)CCH_2$, $CH_3(O)CCH_2CH_2$, Br—CH=CH, phenyl, benzyl, benzoyl, or benzyloxybenzyl, $R^2$ is H, OH, F, $CF_3$, $CH_3$, $CH_3CH_2$, $(CH_3)_2CH$, $(CH_3)_2CH_2CH_2$, $CH_3(O)CCH_2$, $CH_3(O)CCH_2CH_2$, Br—CH=CH, phenyl, phenyloxy, benzyl, benzyloxy, benzoyl, benzoyloxy, or benzyloxybenzyl, and where $R^3$ is benzoyloxy, and $R^4$ is hydroxyl. These include the compounds: 5'-O-benzoyl-2,2'-anhydrouridine; 5'-O-benzoyl-2,2'-anhydro-5-fluorouridine; 5'-O-benzoyl-2,2'-anhydro-5-trifluoromethyluridine; 5'-O-benzoyl-2,2'-anhydro-5-methyluridine; 5'-O-benzoyl-2,2'-anhydro-5- ethyluridine; 5'-O-benzoyl-2,2'-anhydro-5-propyluridine; 5'-O-benzoyl-2,2'-anhydro-5-isopropyluridine; 5'-O-benzoyl-2,2'-O-anhydro-5-isobutyluridine; 5'-O-benzoyl-2,2'-anhydro-5-methylacyluridine; 5'-O-benzoyl-2,2'-anhydro-5-propylacyluridine; 5'-O-benzoyl-2,2'-anhydro-5-(2-bromovinyl)-uridine; 5'-O-benzoyl-2,2'-anhydro-5-phenylluridine; 5'-O-benzoyl-2,2'-anhydro-5-benzyluridine; 5'-O-benzoyl-2,2'-anhydro-5-benzyoluridine; and 5'-O-benzoyl-2,2'-anhydro-5-(benzyloxybenzyl)-uridine. Of specific interest is 5'-O-benzoyl-2,2'-anhydro-5-methyluridine, or the pharmaceutically acceptable salts, solvates, hydrates, and prodrug forms thereof, and stereoisomers thereof.

The 2,2'-anhydropyrimidine compounds of the invention may be in compositions that contain single stereoisomers, mixtures of stereoisomers, as well various derivatives thereof that can occur as equilibrium mixtures of tautomers. For instance, 2,2'-anhydropyrimidines according to formula (I) include four stereo centers with respect to the furano ring, which includes the α and β anomers, and the L or D mirror image configurations. Examples of stereoisomers of the 2,2'-anhydropyrimidine compounds of the invention are the β-D-isomer, β-L-isomer, α-D-isomer, and α-L-isomer, as well as tautomers and mixtures including α,β-D-isomers, α,β-L-isomers, α-DL-isomers, and β-DL-isomers. Thus, in one embodiment, compositions are provided that consists essentially of a stereoisomer of a 2,2'-anhydropyrimidine that is a β-D-isomer, β-L-isomer, α-D-isomer, or an α-L-isomer. Stereoisomers exhibiting improved activity on a molar basis or improved specificity with respect to interfering with radiation therapy efficacy are of special interest.

Stereoisomers of particular interest include: 2,2'-anhydro-1-(β-D-arabinofuranosyl)uracil; 2,2'-anhydro-1-(β-D-arabinofuranosyl)-5-fluorouracil; 2,2'-anhydro-1-(β-D-arabinofuranosyl)-5-trifluoromethyluracil; 2,2'-anhydro-1-(β-D-arabinofuranosyl)-5-methyluracil; 2,2'-anhydro-1-(β-D-arabinofuranosyl)-5-ethyluracil; 2,2'-anhydro-1-(β-D-arabinofuranosyl)-5-n-propyluracil; 2,2'-anhydro-1-(β-D-arabinofuranosyl)-5-isopropyluracil; 2,2'-anhydro-1-(β-D-arabinofuranosyl)-5-isobutyluracil; 2,2'-anhydro-1-(β-D-arabinofuranosyl)-5-methyacyluracil; 2,2'-anhydro-1-(β-D-arabinofuranosyl)-5-propylacyluracil; 2,2'-anhydro-1-(β-D-arabinofuranosyl)-5-(2-bromovinyl)uracil; 2,2'-anhydro-1-(β-D-arabinofuranosyl)-5-phenyluracil; 2,2'-anhydro-1-(β-D-arabinofuranosyl)-5-benzyluracil; 2,2'-anhydro-1-(β-D-arabinofuranosyl)-5-benzyoluracil; and 2,2'-anhydro-1-(β-D-arabinofuranosyl)-5-(3-benzyoxybenzyl)uracil. Further stereoisomers of interest include: 3'-O-benzoyl-2,2'-anhydro-1-(β-D-arabinofuranosyl)uracil; 3'-O-benzoyl-2,2'-anhydro-1-(β-D-arabinofuranosyl)-5-fluororacil; 3'-O-benzoyl-2,2'-anhydro-1-(β-D-arabinofuranosyl)-5-trifluoromethyluracil; 3'-O-benzoyl-2,2'-anhydro-1-(β-D-arabinofuranosyl)-5-methyluracil; 3'-O-benzoyl-2,2'-anhydro-1-(β-D-arabinofuranosyl)-5-ethyluracil; 3'-O-benzoyl-2,2'-anhydro-1-(β-D-arabinofuranosyl)-5-n-propyluracil; 3'-O-benzoyl-2,2'-anhydro-1-(β-D-arabinofuranosyl)-5-isopropyluracil; 3'-O-benzoyl-2,2'-anhydro-1-(β-D-arabinofuranosyl)-5-isobutyluracil; 3'-O-benzoyl-2,2'-anhydro-1-(β-D-arabinofuranosyl)-5-methyacyluracil; 3'-O-benzoyl-2,2'-anhydro-1-(β-D-arabinofuranosyl)-5-propylacyluracil; 3'-O-benzoyl-2,2'-anhydro-1-(β-D-arabinofuranosyl)-5-(2-bromovinyl)uracil; 3'-O-benzoyl-2,2'-anhydro-1-(β-D-arabinofuranosyl)-5-phenyluracil; 3'-O-benzoyl-2,2'-anhydro-1-(β-D-arabinofuranosyl)-5-benzyluracil; 3'-O-benzoyl-2,2'-anhydro-1-(β-D-arabinofuranosyl)-5-benzyoluracil; and 3'-O-benzoyl-2,2'-anhydro-1-(β-D-arabinofuranosyl)-5-(3-benzyoxybenzyl)uracil. Additional stereoisomers of interest include: 5'-O-benzoyl-2,2'-anhydro-1-(β-D-arabinofuranosyl)uracil; 5'-O-benzoyl-2,2'-anhydro-1-(β-D-arabinofuranosyl)-5-fluorouracil; 5'-O-benzoyl-2,2'-anhydro-1-(β-D-arabinofuranosyl)-5-trifluoromethyluracil; 5'-O-benzoyl-2,2'-anhydro-1-(β-D-arabinofuranosyl)-5-methyluracil; 5'-O-benzoyl-2,2'-anhydro-1-(β-D-arabinofuranosyl)-5-ethyluracil; 5'-O-benzoyl-2,2'-anhydro-1-(β-D-arabinofuranosyl)-5-n-propyluracil; 5'-O-benzoyl-2,2'-anhydro-1-(β-D-arabinofuranosyl)-5-isopropyluracil; 5'-O-benzoyl-2,2'-anhydro-1-(β-D-arabinofuranosyl)-5-isobutyluracil; 5'-O-benzoyl-2,2'-anhydro-1-(β-D-arabinofuranosyl)-5-methyacyluracil; 5'-O-benzoyl-2,2'-anhydro-1-(β-D-arabinofuranosyl)-5-propylacyluracil; 5'-O-benzoyl-2,2'-anhydro-1-(β-D-arabinofuranosyl)-5-(2-bromovinyl)uracil; 5'-O-benzoyl-2,2'-anhydro-1-(β-D-arabinofuranosyl)-5-phenyluracil; 5'-O-benzoyl-2,2'-anhydro-1-(β-D-arabinofuranosyl)-5-benzyluracil; 5'-O-benzoyl-2,2'-anhydro-1-(β-D-arabinofuranosyl)-5-benzyoluracil; and 5'-O-benzoyl-2,2'-anhydro-1-(β-D-arabinofuranosyl)-5-(3-benzyoxybenzyl)uracil.

Examples of other analogs or derivatives of the 2,2'-anhydropyrimidines of the invention, and stereoisomers thereof include: 3'-O-acetyl-2,2'-anhydro-5-propyluridine (3'-O-acetyl-2,2'-anhydro-1-(β-D-arabinofuranosyl)-5-propyluracil); and 3'-O-acetyl-2,2'-anhydro-5-isopropyluridine (3'-O-acetyl-2,2'-anhydro-1-(β-D-arabinofuranosyl)-5-isopropyluracil); as well as the 2,2'-anhydrocytidines, and analogs and derivatives thereof, of which the stereoisomer 2,2'-anhydro-1-(β-D-arabinofuranosyl) cytosine is one example.

As noted above, stereoisomers and the various 2,2'-anhydropyrimidines of particular interest are those which exhibit improved activity on a molar basis or improved specificity with respect to not interfering with radiation therapy efficacy. Such compounds can be readily selected for this purpose by comparing against a matrix of compounds of particular interest, such as those illustrated in Table 1 (where the compound is of formula (I)).

TABLE 1

| The compound is of formula (I) | | | | | |
|---|---|---|---|---|---|
| Compound | Stereoisomer | $R^1$ | $R^2$ | $R^3$ | $R^4$ |
| I-a | β-D-isomer | H | H | OH | OH |
| I-b | β-D-isomer | $CH_3$ | H | OH | OH |
| I-c | β-D-isomer | $CH_3CH_2$ | H | OH | OH |
| I-d | β-D-isomer | $CH_3CH_2CH$ | H | OH | OH |
| I-e | β-D-isomer | BrCH=CH | H | OH | OH |
| I-f | β-D-isomer | $C_6H_5CH_2$ | H | OH | OH |
| I-g | β-D-isomer | H | H | $C_6H_5C(O)OOH$ | |
| I-h | β-D-isomer | $CH_3$ | H | $C_6H_5C(O)OOH$ | |
| I-i | β-D-isomer | $CH_3CH_2$ | H | $C_6H_5C(O)OOH$ | |
| I-j | β-D-isomer | $CH_3CH_2CH$ | H | $C_6H_5C(O)OOH$ | |
| I-k | β-D-isomer | BrCH=CH | H | $C_6H_5C(O)OOH$ | |
| I-l | β-D-isomer | $C_6H_5CH_2$ | H | $C_6H_5C(O)OOH$ | |
| I-m | β-D-isomer | F—$C_6H_5CH_2$ | H | OH | OH |
| I-r | β-D-isomer | $NO_2$—$C_6H_5CH_2$ | H | OH | OH |
| I-o | β-D-isomer | $NH_2$—$C_6H_5CH_2$ | H | OH | OH |
| I-p | β-D-isomer | Cl—$_6H_5CH_2$ | H | OH | OH |
| I-q | β-D-isomer | Alkyl-$C_6H_5CH_2$ | H | OH | OH |
| I-r | β-D-isomer | Methoxy-$C_6H_5CH_2$ | H | OH | OH |
| I-s | β-D-isomer | Thiol-$C_6H_5CH_2$ | H | OH | OH |
| I-t | β-D-isomer | F—$C_6H_5CH_2$ | H | $C_6H_5C(O)OOH$ | |
| I-u | β-D-isomer | $NO_2$—$C_6H_5CH_2$ | H | $C_6H_5C(O)OOH$ | |

TABLE 1-continued

The compound is of formula (I)

| Compound | Stereoisomer | $R^1$ | $R^2$ | $R^3$ | $R^4$ |
|---|---|---|---|---|---|
| I-v | β-D-isomer | $NH_2$—$C_6H_5CH_2$ | H | | $C_6H_5C(O)OOH$ |
| I-w | β-D-isomer | Cl—$C_6H_5CH_2$ | H | | $C_6H_5C(O)OOH$ |
| I-x | β-D-isomer | Alkyl-$C_6H_5CH_2$ | H | | $C_6H_5C(O)OOH$ |
| I-y | β-D-isomer | Methoxy-$C_6H_5CH_2$ | H | | $C_6H_5C(O)OOH$ |
| I-z | β-D-isomer | Thiol-$C_6H_5CH_2$ | H | | $C_6H_5C(O)OOH$ |
| I-a' | β-D-isomer | H | OH | H | OH |
| I-b' | β-D-isomer | $CH_3$ | OH | H | OH |
| I-c' | β-D-isomer | $CH_3CH_2$ | OH | H | OH |
| I-d' | β-D-isomer | $CH_3CH_2CH$ | OH | H | OH |
| I-e' | β-D-isomer | BrCH=CH | OH | H | OH |
| I-f' | β-D-isomer | $C_6H_5CH_2$ | OH | H | OH |
| I-g' | β-D-isomer | H | $C_6H_5C(O)O$ | H | OH |
| I-h' | β-D-isomer | $CH_3$ | $C_6H_5C(O)O$ | H | OH |
| I-i' | β-D-isomer | $CH_3CH_2$ | $C_6H_5C(O)O$ | H | OH |
| I-j' | β-D-isomer | $CH_3CH_2CH$ | $C_6H_5C(O)O$ | H | OH |
| I-k' | β-D-isomer | BrCH=CH | $C_6H_5C(O)O$ | H | OH |
| I-l' | β-D-isomer | $C_6H_5CH_2$ | $C_6H_5C(O)O$ | H | OH |
| I-m' | β-D-isomer | F—$C_6H_5CH_2$ | OH | H | OH |
| I-n' | β-D-isomer | $NO_2$—$C_6H_5CH_2$ | OH | H | OH |
| I-o' | β-D-isomer | $NH_2$—$C_6H_5CH_2$ | OH | H | OH |
| I-p' | β-D-isomer | Cl—$C_6H_5CH_2$ | OH | H | OH |
| I-q' | β-D-isomer | Alkyl-$C_6H_5CH_2$ | OH | H | OH |
| I-r' | β-D-isomer | Methoxy-$C_6H_5CH_2$ | OH | H | OH |
| I-s' | β-D-isomer | Thiol-$C_6H_5CH_2$ | OH | H | OH |
| I-t' | β-D-isomer | F—$C_6H_5CH_2$ | $C_6H_5C(O)O$ | H | OH |
| I-u' | β-D-isomer | $NO_2$—$C_6H_5CH_2$ | $C_6H_5C(O)O$ | H | OH |
| I-v' | β-D-isomer | $NH_2$—$C_6H_5CH_2$ | $C_6H_5C(O)O$ | H | OH |
| I-w' | β-D-isomer | Cl—$C_6H_5CH_2$ | $C_6H_5C(O)O$ | H | OH |
| I-x' | β-D-isomer | Alkyl-$C_6H_5CH_2$ | $C_6H_5C(O)O$ | H | OH |
| I-y' | β-D-isomer | Methoxy-$C_6H_5CH_2$ | $C_6H_5C(O)O$ | H | OH |
| I-z' | β-D-isomer | Thiol-$C_6H_5CH_2$ | $C_6H_5C(O)O$ | H | OH |

As mentioned above, the compounds in Table I are illustrative but not limiting. For example, $R^4$ can be not only hydroxyl, but also an O-acyl, alkoxy, alkoxycarbonyl, alkoxycarbonylamino, O-alkyl, O-alkylene, O-alkynyl, O-aralkyl, O-aryl, O-aryloxy, O-carbohydrate, O-cycloalkenyl, O-cycloalkyl, O-heterocycloalkyl, O-heteroaryl. In addition, an S can substitute for the O and other combinations of the structural elements such as described herein, as well as other stereochemical orientations, are also possible.

In certain embodiments, acyl derivatives of the 2,2'-anyhydropyrimidines of formula (I) are of interest. Thus, compounds of formula (I) include those in which $R^1$, $R^2$, $R^3$ and $R^4$ are as defined above, wherein at least one of $R^2$, $R^3$ and $R^4$ is an acyl derivative. By "acyl derivative" is intended a derivative of a 2,2'-anyhydropyrimidine of formula (I) in which at least one of $R^2$, $R^3$ and $R^4$ is a substantially nontoxic organic acyl substituent obtainable from a carboxylic acid that is attached to a hydroxyl group on the ribose or pyrimidine ring of formula (I) through an ester linkage.

Acyl derivatives of a 2,2'-anyhydropyrimidine compound of formula (I) include those in which $R^1$ is as defined above, and each $R^2$, $R^3$ and $R^4$ is independently hydrogen, hydroxyl or an acyl radical, with the proviso that at least one of $R^2$, $R^3$ and $R^4$ is not hydrogen. In another embodiment, the acyl derivative of a 2,2'-anyhydropyrimidine is a compound of formula (I) in which $R^1$ and $R^2$ are as defined above, with the proviso that $R^2$ is other than hydrogen, and each $R^3$ and $R^4$ is independently hydroxyl or an acyl radical. In one embodiment, the acyl derivative of a 2,2'-anyhydropyrimidine is a compound of formula (I) in which $R^1$ is as defined above, $R^2$ is hydrogen, and each $R^3$ and $R^4$ is independently hydroxyl or an acyl radical. Of particular interest, is an acyl derivative of a 2,2'-anyhydropyrimidine compound of formula (I), wherein $R^1$ is methyl, $R^2$ is hydrogen, and each $R^3$ and $R^4$ is independently hydroxyl or an acyl radical. Also of interest is an acyl derivative of a 2,2'-anyhydropyrimidine compound of formula (I), wherein $R^1$ is methyl, $R^2$ is hydrogen, and each $R^3$ and $R^4$ is an acyl radical.

In general, the ester linkage(s) of an acyl derivative of formula (I) are cleavable under physiological conditions, either in vitro, such as in a cell-based system, and/or in vivo, such as through metabolism in a body. Thus, in certain embodiments, the acyl radical is a radical of a metabolite. Such acyl substituents include, but are not limited to, those derived from acetic acid, fatty acids, amino acids, lipoic acid, glycolic acid, lactic acid, enolpyruvic acid, pyruvic acid, orotic acid, acetoacetic acid, beta-hydroxybutyric acid, creatinic acid, succinic acid, fumaric acid, adipic acid, benzoic acid and p-aminobenzoic acid. Particular acyl substituents of interest are compounds which are normally present in the body, either as dietary constituents or as intermediary metabolites, and which are essentially nontoxic when cleaved from the 2,2'-anyhydropyrimidine compound of interest in vivo.

Of particular interest are compositions comprising a 3'-O-acyl-2,2'-anyhydropyrimidine or derivative thereof. For example, acyl derivatives of interest are those that include a 2,2'-anyhydropyrimidine compound of formula (I), where each $R^1$, $R^2$ and $R^3$ is independently selected from selected from hydrogen, hydroxyl, sulfyhydryl, amino, hydroxymethyl, methoxy, halogen, pseudohalogen, and a substituted or unsubstituted lower hydrocarbon containing 1 to 20 carbons, such as a lower hydrocarbon selected from alkyl, alkenyl, alkanoyl, aryl, aroyl, aralkyl and alkylamino, and esters thereof, and where $R^4$ is an O-acyl radical.

In certain embodiments, the acyl derivatives include a 2,2'-anyhydropyrimidine compound of formula (I), where $R^4$ is an O-acyl radical, and where the O-acyl radical comprises 1 to 10 carbon atoms, such as an O-acyl radical selected from aroyloxy, aralkoyloxy, heteroaroyloxy, and cycloalkoyloxy.

Accordingly, acyl derivatives of a 2,2'-anyhydropyrimidine compound of formula (I) include 3'-O-acyl-2,2'-anyhdropyrimidines, 5'-O-acyl-2,2'-anyhydropyrimidines, 3',5'-O-acyl-2,2'-anyhydropyrimidines, and derivatives thereof. For example, 3'-O-acyl-2,2'-anyhydropyrimidines or derivatives thereof include 3'-O-aroyl-2,2'-anyhydropyrimidines, such as a 3'-O-aroyl-2,2'-anyhydrouridine or derivative thereof. An example of particular interest is 3'-O-benzoyl-2,2'-anyhdrouridine or derivative thereof, such as 3'-O-benzoyl-2,2'-anhydro-5-methyluridine. Also of interest is a compound in which the 3'-O-benzoyl-2,2'-anhydro-5-methyluridine is the stereoisomer 3'-O-benzoyl-2,2'-anhydro-1-(β-D-arabino-furanosyl)-5-methyluracil.

In some embodiments, acyl derivatives of a 2,2'-anyhydropyrimidine compound of formula (I) include those where: $R^1$ is H, F, $CF_3$, $CH_3$, $CH_3CH_2$, $CH_3CH_2CH_2$, $(CH_3)_2CH$, $(CH_3)_2CH_2CH_2$, $CH_3(O)CCH_2$, $CH_3(O)CCH_2CH_2$, Br—CH=CH, phenyl, benzyl, benzoyl, or benzyloxybenzyl, $R^2$ is H, OH, F, $CF_3$, $CH_3$, $CH_3CH_2$, $CH_3CH_2CH_2$, $(CH_3)_2CH$, $(CH_3)_2CH_2CH_2$, $CH_3(O)CCH_2$, CH₃(O)CCH₂CH₂, Br—CH=CH, phenyl, phenyloxy, benzyl, benzyloxy, benzoyl, benzyloxybenzyl, or acyl radical, and where each $R^3$ and $R^4$ is independently hydroxyl or an acyl radical. These include the compounds: 3'-O-benzoyl-2,2'-anhydrouridine; 3'-O-benzoyl-2,2'-anhydro-5-fluorouridine; 3'-O-benzoyl-2,2'-anhydro-5-trifluoromethyluridine; 3'-O-benzoyl-2,2'-anhydro-5-methyluridine; 3'-O-benzoyl-2,2'-anhydro-5-ethyluridine; 3'-O-benzoyl-2,2'-anhydro-5-propyluridine; 3'-O-benzoyl-2,2'-anhydro-5-isopropyluridine; 3'-O-benzoyl-2,2'-O-anhydro-5-isobutyluridine; 3'-O-benzoyl-2,2'-anhydro-5-methylacyluridine; 3'-O-benzoyl-2,2'-anhydro-5-propylacyluridine; 3'-O-benzoyl-2,2'-anhydro-5-(2-bromovinyl)-uridine; 3'-O-benzoyl-2,2'-anhydro-5-phenylluridine; 3'-O-benzoyl-2,2'-anhydro-5-benzyluridine; 3'-O-benzoyl-2,2'-anhydro-5-benzyoluridine; and 3'-O-benzoyl-2,2'-anhydro-5-(benzyloxybenzyl)-uridine; 5'-O-benzoyl-2,2'-anhydrouridine; 5'-O-benzoyl-2,2'-anhydro-5-fluorouridine; 5'-O-benzoyl-2,2'-anhydro-5-trifluoromethyluridine; 5'-O-benzoyl-2,2'-anhydro-5-methyluridine; 5'-O-benzoyl-2,2'-anhydro-5-ethyluridine; 5'-O-benzoyl-2,2'-anhydro-5-propyluridine; 5'-O-benzoyl-2,2'-anhydro-5-isopropyluridine; 5'-O-benzoyl-2,2'-O-anhydro-5-isobutyluridine; 5'-O-benzoyl-2,2'-anhydro-5-methylacyluridine; 5'-O-benzoyl-2,2'-anhydro-5-propylacyluridine; 5'-O-benzoyl-2,2'-anhydro-5-(2-bromovinyl)-uridine; 5'-O-benzoyl-2,2'-anhydro-5-phenylluridine; 5'-O-benzoyl-2,2'-anhydro-5-benzyluridine; 5'-O-benzoyl-2,2'-anhydro-5-benzyoluridine; and 5'-O-benzoyl-2,2'-anhydro-5-(benzyloxybenzyl)-uridine; 3',5'-O-benzoyl-2,2'-anhydrouridine; 3',5'-O-benzoyl-2,2'-anhydro-5-fluorouridine; 3',5'-O-benzoyl-2,2'-anhydro-5-trifluoromethyluridine; 3',5'-O-benzoyl-2,2'-anhydro-5-methyluridine; 3',5'-O-benzoyl-2,2'-anhydro-5-ethyluridine; 3',5'-O-benzoyl-2,2'-anhydro-5-propyluridine; 3',5'-O-benzoyl-2,2'-anhydro-5-isopropyluridine; 3',5'-O-benzoyl-2,2'-O-anhydro-5-isobutyluridine; 3',5'-O-benzoyl-2,2'-anhydro-5-methylacyluridine; 3',5'-O-benzoyl-2,2'-anhydro-5-propylacyluridine; 3',5'-O-benzoyl-2,2'-anhydro-5-(2-bromovinyl)-uridine; 3',5'-O-benzoyl-2,2'-anhydro-5-phenylluridine; 3',5'-O-benzoyl-2,2'-anhydro-5-benzyluridine; 3',5'-O-benzoyl-2,2'-anhydro-5-benzyoluridine; and 3',5'-O-benzoyl-2,2'-anhydro-5-(benzyloxybenzyl)-uridine; or the pharmaceutically acceptable salts, solvates, hydrates, and prodrug forms thereof, and stereoisomers thereof.

Of specific interest is 3'-O-benzoyl-2,2'-anhydro-5-methyluridine, 5'-O-benzoyl-2,2'-anhydro-5-methyluridine, and 3',5'-O-benzoyl-2,2'-anhydro-5-methyluridine, or the pharmaceutically acceptable salts, solvates, hydrates, and prodrug forms thereof, and stereoisomers thereof. Of specific interest are the β-D-arabinofuranosyl isomers of these compounds, or the pharmaceutically acceptable salts, solvates, hydrates, and prodrug forms thereof.

In another embodiment, compounds according to formula (I) of specific interest are those where $R^1$ and $R^4$ are as defined above, and $R^2$ and/or $R^3$ is a cyclic hydrocarbyl. By "cyclic hydrocarbyl" is intended a hydrocarbon-based ring structure having from 3 to about 10 carbon atoms, and having a single cyclic ring or multiple condensed rings that may be substituted. Cyclic hydrocarbyls of interest are selected from aryl, aralkyl, aryloxy, aroyl, aroyloxy, heteroaryl, heteroaryloxy, heteroaroyloxy, cycloalkyl, cycloalkyloxy and cycloalkoyloxy. Thus, cyclic hydrocarbyls of special interest are O-linked to the ribose or pyrimidine ring of formula (I). Compounds where $R^2$ and/or $R^3$ is a cyclic hydrocarbyl exhibit improved activity on a molar basis, or improved specificity with respect to not interfering with radiation therapy efficacy.

Accordingly, certain compounds of the invention comprise a 5'-O-(cyclic hydrocarbyl)-2,2'-anhydropyrimidine or derivative thereof. This embodiment includes 5'-O-(cyclic hydrocarbyl)-2,2'-anhydro-5($R^5$)-uridine or derivatives thereof, where $R^5$ is $R^1$ (e.g., $R^5 = R^1$ where "5($R^5$)" refers to, and is the same as $R^1$ of formula (I)).

A compound of interest is 5'-O-aryl-2,2'-anhydropyrimidine or derivative thereof, of which various 2,2'-anhydrouridine derivatives are of included. This includes compounds where the 5'-O-aryl-2,2'-anhydropyrimidine is a 5'-O-aroyl-2,2'-anhydropyrimidine, such as: 5'-O-benzoyl-2,2'-anhydropyrimidine; 5'-O-chlorobenzyl-2,2'-anhydropyrimidine; 5'-O-nitrobenzyl-2,2'-anhydropyrimidine; 5'-O-hydroxybenzyl-2,2'-anhydropyrimidine, and the like.

In one embodiment, compounds that exhibit improved activity on a molar basis or improved specificity with respect to not interfering with radiation therapy efficacy are the 5'-O-aryl-2,2'-anhydrouridines, 5'-O-aroyl-2,2'-anhydrouridines, and derivatives thereof, such as 5'-O-aryl-2,2'-anhydro-5($R^4$)-uridine, 5'-O-aroyl-2,2'-anhydro-5($R^4$)-uridine, and their derivatives. Examples include 5'-O-aryl-2,2'-anhydro-5-methyl-uridine; 5'-O-aryl-2,2'-anhydro-5-ethyl-uridine; 5'-O-aryl-2,2'-anhydro-5-propyl-uridine; 5'-O-aryl-2,2'-anhydro-5-benzyl-uridine; and 5'-O-aryl-2,2'-anhydro-5-(2-bromovinyl)-uridine; and derivatives thereof. Examples also include 5'-O-aroyl-2,2'-anhydro-5-methyl-uridine; 5'-O-aroyl-2,2'-anhydro-5-ethyl-uridine; 5'-O-aroyl-2,2'-anhydro-5-propyl-uridine; 5'-O-aroyl-2,2'-anhydro-5-benzyl-uridine; and 5'-O-aroyl-2,2'-anhydro-5-(2-bromovinyl)-uridine; and derivatives thereof. Compounds of specific interest include 5'-O-benzoyl-2,2'-anhydro-5($R^4$)-uridines, such as 5'-O-benzoyl-2,2'-anhydro-5-methyl-uridine; 5'-O-benzoyl-2,2'-anhydro-5-ethyl-uridine; 5'-O-benzoyl-2,2'-anhydro-5-propyl-uridine; 5'-O-benzoyl-2,2'-anhydro-5-benzyl-uridine; and 5'-O-benzoyl-2,2'-anhydro-5-(2-bromovinyl)-uridine.

Stereoisomers of interest include the 5'-O-(cyclic hydrocarbyl)-2,2'-anhydropyrimidines which are the β-D-isomers. Examples include, but are not limited to: 5'-O-benzoyl-2,2'-anhydro-1-(β-D-arabinofuranosyl) uracil; 5'-O-benzoyl-2,2'-anhydro-1-(β-D-arabinofuranosyl)-5-fluorouracil; 5'-O-benzoyl-2,2'-anhydro-1-(β-D-arabinofuranosyl)-5-trifluoromethyluracil; 5'-O-benzoyl-2,2'-anhydro-1-(β-D-arabinofuranosyl)-5-methyluracil; 5'-O-benzoyl-2,2'-anhydro-1-(β-D-arabinofuranosyl)-5-ethyluracil; 5'-O-benzoyl-2,2'-anhydro-1-(β-D-arabinofuranosyl)-5-n-propyluracil; 5'-O-benzoyl-2,2'-anhydro-1-(β-D-arabinofuranosyl)-5-isopropyluracil; 5'-O-benzoyl-2,2'-anhydro-1-(β-D-arabinofuranosyl)-5-isobutyluracil; 5'-O-benzoyl-2,2'-anhydro-1-(β-D-arabinofuranosyl)-5-methyacyluracil; 5'-O-benzoyl-2,2'-anhydro-1-(β-D-arabinofuranosyl)-5-propylacyluracil; 5'-O-benzoyl-2,2'-anhydro-1-(β-D-arabinofuranosyl)-5-(2-bromovinyl)uracil; 5'-O-benzoyl-2,2'-anhydro-1-(β-D-arabinofuranosyl)-5-phenyluracil; 5'-O-benzoyl-2,2'-anhydro-1-(β-D-arabinofuranosyl)-5-benzyluracil; 5'-O-benzoyl-2,2'-anhydro-1-(β-D-arabinofuranosyl)-5-benzyoluracil; and 5'-O-benzoyl-2,2'-anhydro-1-(β-D-arabinofuranosyl)-5-(3-benzyoxybenzyl)uracil.

As noted above, also of interest are analogues/derivatives of the above compounds, where such analogs/derivatives reduce radiation therapy induced toxicity, such that radiation therapy induced toxicity is reduced when the compounds are administered in conjunction with radiation therapy according to the subject invention. As also indicated above, an effective amount of radiation toxicity-reducing adjuvant is employed in the subject methods.

Certain 2,2'-anhydropyrimidine and derivatives thereof described above are commercially available or can be conventionally prepared by techniques known to one of skill in the art. For example, representative patents describing various 2,2'-anhydropyrimidine and derivatives, including intermediates and precursors, analysis, as well as the synthesis/preparation thereof, include U.S. Pat. Nos. 3,975,367; 4,145,531; 4,230,698; 4,247,544; 4,544,740; 4,604,382; 4,613,604; 4,681,933; 4,841,039; 4,916,122; 4,987,224; 5,008,384; 5,077,280; 5,084,445; 5,141,943; 5,190,926; 5,212,293; 5,278,167; 5,384,396; 5,455,339; 5,476,855; 5,596,093; 5,610,292; 5,721,241; 5,723,449; 5,739,314; 5,760,202; 5,889,013; 5,861,493; 6,060,592; 6,090,932; 6,222,025; 6,369,040; 6,642,367; 6,670,461; 6,867,290; and 7,176,295; the disclosures of which are herein incorporated by reference. See also, the following references: Veres et al., Biochem Pharmacol. 34(10):1737 (1985); Veres et al., Drugs Exp Clin Res. 13(10):615 (1987); el Konui et al, Mol. Pharmacology 34:104 (1988); Cienfuegos et al. Org. Lett. 7(11):2161 (2005); Choi et al., Nucleosides Nucleotides Nucleic Acids 22(5-8):547 (2003); Rodriquez et al., J Med Chem 37(20):3389 (1994); McGee, D. P. C. et al., "Novel Nucleosides via Intramolecular Functionalization of 2,2' Anahydrouridine Derivatives", Tetr. Lett., 37(12):1995 (1996); Machulla et al. J. Nucl. Med. 42(5):257 (2001); Czernecki S. et al. Nucleosides & Nucleotides 14:1227 (1995); Heterocyclic Chemistry (3rd Edition), Thomas. L. Gilchrist, Prentice Hall (1997); Movassaghi, M. and M. D. Hill, J. Am. Chem. Soc. 128(44):14254 (2006); Brown, D. J. Heterocyclic Compounds: The Pyrimidines. Vol 52. New York: Interscience, 1994; Eaton, (1995) Annu. Rev. Biochem. 64, 837; Usman and Cedergreen TIBS 17:334 (1992); Greene and Wuts (1991) Protective Groups in Organic Synthesis, 2nd Ed., Wiley Interscience); Moffatt, (1979) Nucleoside Analogues, Ed. Walker, NY, Plenum.; Townsend, (1988) Chemistry of Nucleosides and Nucleotides, NY, Plenum; and Sproat, et al., (1991) Oligonucleotides and Analogues: A Practical Approach, ed. F. Eckstein, NY. Oxford Univ. Press)).

Of interest are 2,2'-anhydropyrimidines and derivatives thereof that are inhibitors of uridine phosphorylase. Uridine phosphorylase (UPh; EC 2.4.2.3) is a member of the pyrimidine nucleoside phosphorylase family of enzymes which catalyzes the phosphorolytic cleavage of the C—N glycoside bond of uridine, with the formation of ribose 1-phosphate and uracil (Timofeev et al., Acta Crystallogr Sect F Struct Biol Cryst Commun., 63: 852-854 (2007)).

The scope of the present invention includes prodrugs of the radiation toxicity-reducing adjuvant. Such prodrugs are, in general, functional derivatives of the compounds that are readily convertible in vivo into the required compounds. Thus, in the methods of the present invention, the term "administering" encompasses administering the compound specifically disclosed or with a compound which may not be specifically disclosed, but which converts to the specified compound in vivo after administration to the subject in need thereof. Conventional procedures for the selection and preparation of suitable prodrug derivatives are described, e.g., in Wermuth, "Designing Prodrugs and Bioprecursors" in Wermuth, ed. The Practice of Medicinal Chemistry, 2d Ed., pp. 561-586 (Academic Press 2003). Prodrugs include esters that hydrolyze in vivo (e.g., in the human body) to produce a compound described herein suitable for the present invention. Suitable ester groups include, without limitation, those derived from pharmaceutically acceptable, aliphatic carboxylic acids, particularly alkanoic, alkenoic, cycloalkanoic and alkanedioic acids, in which each alkyl or alkenyl moiety has no more than 6 carbon atoms. Illustrative esters include formates, acetates, propionates, butyrates, acrylates, citrates, succinates, and ethylsuccinates.

Formulations

Also provided are pharmaceutical compositions containing the radiation toxicity-reducing adjuvant employed in the subject methods. Accordingly, the radiation toxicity-reducing adjuvant in pharmaceutical compositions, e.g., in the form of a pharmaceutically acceptable salt, can be formulated for oral, topical or parenteral administration for use in the subject methods, as described above.

By way of illustration, the radiation toxicity-reducing adjuvant can be admixed with conventional pharmaceutically acceptable carriers and excipients (i.e., vehicles) and used in the form of aqueous solutions, tablets, capsules, elixirs, suspensions, syrups, wafers, and the like. Such pharmaceutical compositions contain, in certain embodiments, from about 0.1% to about 90% by weight of the active compound, and more generally from about 1% to about 30% by weight of the active compound. The pharmaceutical compositions may contain common carriers and excipients, such as corn starch or gelatin, lactose, dextrose, sucrose, microcrystalline cellulose, kaolin, mannitol, dicalcium phosphate, sodium chloride, and alginic acid. Disintegrators commonly used in the formulations of this invention include croscarmellose, microcrystalline cellulose, corn starch, sodium starch glycolate and alginic acid.

A liquid composition will generally consist of a suspension or solution of the compound or pharmaceutically acceptable salt in a suitable liquid carrier(s), for example, ethanol, glycerine, sorbitol, non-aqueous solvent such as polyethylene glycol, oils or water, with a suspending agent, preservative, surfactant, wetting agent, flavoring or coloring agent. Alternatively, a liquid formulation can be prepared from a reconstitutable powder.

For example, a powder containing active compound, suspending agent, sucrose and a sweetener can be reconstituted with water to form a suspension; and a syrup can be prepared from a powder containing active ingredient, sucrose and a sweetener.

A composition in the form of a tablet can be prepared using any suitable pharmaceutical carrier(s) routinely used for preparing solid compositions. Examples of such carriers include magnesium stearate, starch, lactose, sucrose, microcrystalline cellulose and binders, for example, polyvinylpyrrolidone. The tablet can also be provided with a color film coating, or color included as part of the carrier(s). In addition, active compound can be formulated in a controlled release dosage form as a tablet comprising a hydrophilic or hydrophobic matrix.

A composition in the form of a capsule can be prepared using routine encapsulation procedures, for example, by incorporation of active compound and excipients into a hard gelatin capsule. Alternatively, a semi-solid matrix of active compound and high molecular weight polyethylene glycol can be prepared and filled into a hard gelatin capsule; or a solution of active compound in polyethylene glycol or a suspension in edible oil, for example, liquid paraffin or fractionated coconut oil can be prepared and filled into a soft gelatin capsule.

Tablet binders that can be included are acacia, methylcellulose, sodium carboxymethylcellulose, poly-vinylpyrrolidone (Povidone), hydroxypropyl methylcellulose, sucrose, starch and ethylcellulose. Lubricants that can be used include magnesium stearate or other metallic stearates, stearic acid, silicone fluid, talc, waxes, oils and colloidal silica.

Flavoring agents such as peppermint, oil of wintergreen, cherry flavoring or the like can also be used. Additionally, it may be desirable to add a coloring agent to make the dosage form more attractive in appearance or to help identify the product.

The compounds of the invention and their pharmaceutically acceptable salts that are active when given parenterally can be formulated for intramuscular, intrathecal, or intravenous administration.

A typical composition for intramuscular or intrathecal administration will be of a suspension or solution of active ingredient in an oil, for example, *arachis* oil or sesame oil. A typical composition for intravenous or intrathecal administration will be a sterile isotonic aqueous solution containing, for example, active ingredient and dextrose or sodium chloride, or a mixture of dextrose and sodium chloride. Other examples are lactated Ringer's injection, lactated Ringer's plus dextrose injection, Normosol-M and dextrose, Isolyte E, acylated Ringer's injection, and the like. Optionally, a co-solvent, for example, polyethylene glycol, a chelating agent, for example, ethylenediamine tetracetic acid, and an anti-oxidant, for example, sodium metabisulphite may be included in the formulation. Alternatively, the solution can be freeze dried and then reconstituted with a suitable solvent just prior to administration.

The compounds of the invention and their pharmaceutically acceptable salts which are active on rectal administration can be formulated as suppositories. A typical suppository formulation will generally consist of active ingredient with a binding and/or lubricating agent such as a gelatin or cocoa butter or other low melting vegetable or synthetic wax or fat.

The compounds of this invention and their pharmaceutically acceptable salts which are active on topical administration can be formulated as transdermal compositions or transdermal delivery devices ("patches"). Such compositions include, for example, a backing, active compound reservoir, a control membrane, liner and contact adhesive. Such transdermal patches may be used to provide continuous or discontinuous infusion of the compounds of the present invention in controlled amounts. The construction and use of transdermal patches for the delivery of pharmaceutical agents is well known in the art. See, e.g., U.S. Pat. No. 5,023,252, herein incorporated by reference in its entirety. Such patches may be constructed for continuous, pulsatile, or on demand delivery of pharmaceutical agents.

One skilled in the art will appreciate that a variety of suitable methods of administering a formulation of the present invention to a subject or host, e.g., patient, in need thereof, are available, and, although more than one route can be used to administer a particular formulation, a particular route can provide a more immediate and more effective reaction than another route. Pharmaceutically acceptable excipients are also well-known to those who are skilled in the art and are readily available. The choice of excipient will be determined in part by the particular compound, as well as by the particular method used to administer the composition. Accordingly, there are a wide variety of suitable formulations of the pharmaceutical composition of the present invention. The following methods and excipients are merely exemplary and are in no way limiting.

Formulations suitable for oral administration can consist of (a) liquid solutions, such as an effective amount of the compound dissolved in diluents, such as water, saline, or orange juice; (b) capsules, sachets or tablets, each containing a predetermined amount of the active ingredient, as solids or granules; (c) suspensions in an appropriate liquid; and (d) suitable emulsions. Tablet forms can include one or more of lactose, mannitol, corn starch, potato starch, microcrystalline cellulose, acacia, gelatin, colloidal silicon dioxide, croscarmellose sodium, talc, magnesium stearate, stearic acid, and other excipients, colorants, diluents, buffering agents, moistening agents, preservatives, flavoring agents, and pharmacologically compatible excipients. Lozenge forms can comprise the active ingredient in a flavor, usually sucrose and acacia or tragacanth, as well as pastilles comprising the active ingredient in an inert base, such as gelatin and glycerin, or sucrose and acacia, emulsions, gels, and the like containing, in addition to the active ingredient, such excipients as are known in the art.

The subject formulations of the present invention can be made into aerosol formulations to be administered via inhalation. These aerosol formulations can be placed into pressurized acceptable propellants, such as dichlorodifluoromethane, propane, nitrogen, and the like. They may also be formulated as pharmaceuticals for non-pressured preparations such as for use in a nebulizer or an atomizer.

Formulations suitable for parenteral administration include aqueous and non-aqueous, isotonic sterile injection solutions, which can contain anti-oxidants, buffers, bacteriostats, and solutes that render the formulation isotonic with the blood of the intended recipient, and aqueous and non-aqueous sterile suspensions that can include suspending agents, solubilizers, thickening agents, stabilizers and preservatives. The formulations can be presented in unit-dose or multi-dose sealed containers, such as ampules and vials, and can be stored in a freeze-dried (lyophilized) condition requiring only the addition of the sterile liquid excipient, for example, water, for injections, immediately prior to use. Extemporaneous injection solutions and suspensions can be prepared from sterile powders, granules, and tablets of the kind previously described.

Formulations suitable for topical administration may be presented as creams, gels, pastes, or foams, containing, in addition to the active ingredient, and other such carriers that are known in the art to be appropriate.

Suppository formulations are also provided by mixing with a variety of bases such as emulsifying bases or water-soluble bases. Formulations suitable for vaginal administration may be presented as pessaries, tampons, creams, gels, pastes and foams.

Unit dosage forms for oral or rectal administration such as syrups, elixirs, and suspensions may be provided wherein each dosage unit, for example, teaspoonful, tablespoonful, tablet or suppository, contains a predetermined amount of the composition containing one or more inhibitors. Similarly, unit dosage forms for injection or intravenous administration may comprise the inhibitor(s) in a composition as a solution in sterile water, normal saline or another pharmaceutically acceptable carrier.

The term "unit dosage form," as used herein, refers to physically discrete units suitable as unitary dosages for human and animal subjects, each unit containing a predetermined quantity of compounds of the present invention calculated in an amount sufficient to produce the desired effect in association with a pharmaceutically acceptable diluent, carrier or vehicle. The specifications for the novel unit dosage forms of the present invention depend on the particular compound employed and the effect to be achieved, and the pharmacodynamics associated with each compound in the host.

Those of skill in the art will readily appreciate that dose levels can vary as a function of the specific compound, the nature of the delivery vehicle, and the like. Suitable dosages for a given compound are readily determinable by those of skill in the art by a variety of means.

The dose administered to an animal, particularly a human, in the context of the present invention should be sufficient to cause a prophylactic or therapeutic response in the animal over a reasonable time frame. One skilled in the art will recognize that dosage will depend on a variety of factors including the strength of the particular compound employed, the condition of the animal, and the body weight of the animal, as well as the severity of the illness and the stage of the disease. The size of the dose will also be determined by the existence, nature, and extent of any adverse side-effects that might accompany the administration of a particular compound. Suitable doses and dosage regimens can be determined by comparisons to anticancer or immunosuppressive agents that are known to cause the desired growth inhibitory or immunosuppressive response.

Optionally, the pharmaceutical composition may contain other pharmaceutically acceptable components, such as buffers, surfactants, antioxidants, viscosity modifying agents, preservatives, and the like. Each of these components is well-known in the art. For example, see U.S. Pat. No. 5,985,310, the disclosure of which is herein incorporated by reference.

Other components suitable for use in the formulations of the present invention can be found in Remington's Pharmaceutical Sciences, Mace Publishing Company, Philadelphia, Pa., 17th ed. (1985). In an embodiment, the aqueous solution of cyclodextrin also contains dextrose, e.g., about 5% dextrose.

Utility

The subject methods find use in a variety of applications. The subject methods and compositions find use in known applications of radiation therapy, such as in treating diseases or disorders that are capable of being treated using radiation therapy. Use of the subject compositions of the present invention is of particular utility in, for example, the treatment of diseases and disorders including, but not limited to, cancer and other cellular proliferative diseases/conditions, etc. In these capacities, use of the present inventive compositions will result in reduced toxicity while retaining the desired radiation therapy activity.

As such, the subject methods and compositions find use in therapeutic applications in which radiation therapy administration is indicated. A representative therapeutic application is in the treatment of cellular proliferative disease conditions, e.g., cancers and related conditions characterized by abnormal cellular proliferation. Such disease conditions include cancer and neoplastic diseases and other diseases characterized by the presence of unwanted cellular proliferation, e.g., hyperplasias, and the like.

By treatment, is meant that at least an amelioration of the symptoms associated with the condition afflicting the host is achieved, where amelioration is used in a broad sense to refer to at least a reduction in the magnitude of a parameter, e.g., a symptom associated with the condition being treated or a side effect resulting from administration of a drug. As such, treatment also includes situations where the pathological condition, or at least symptoms associated therewith, are completely inhibited, e.g., prevented from happening, or stopped, e.g., terminated, such that the host no longer suffers from the condition, or at least the symptoms that characterize the condition.

A specific application of interest is the use of anhydronucleosides, particularly 2,2'-anhydropyrimidines and derivatives thereof, to ameliorate radiation therapy-induced mucositis. Thus, in certain embodiments, a method is provided for the treatment of a subject (i.e., host) in need thereof an effective amount of radiation therapy in conjunction with an amount of a radiation toxicity-reducing adjuvant effective to reduce radiation therapy-induced mucositis in the host, wherein the radiation toxicity-reducing adjuvant is a 2,2'-anhydropyrimidine or derivative thereof. In a related embodiment, the radiation therapy-induced mucositis is stomatitis. In another related embodiment, the radiation therapy-induced mucositis is characterized by one or more features selected from myelosuppression, weight loss, inflammation, and infection. Of specific interest is the use of 2,2'-anhydro-5-methyluridine and acyl derivatives thereof as the radiation toxicity-reducing adjuvant to reduce radiation therapy-induced mucositis in the host.

Reduction of radiation therapy-induced mucositis is characterized by the prevention, mitigation, or reduction of the likelihood of onset of mucositis resulting from treatment of a host with radiation therapy. This includes treatment of a host in need thereof with an effective amount of radiation therapy in conjunction with an amount of a radiation toxicity-reducing adjuvant effective to reduce radiation therapy-induced mucositis in the host, where the radiation toxicity-reducing adjuvant improves the likelihood of successfully preventing or eliminating one or more features of mucositis when it has occurred including: (i) prevention, that is, causing the clinical symptoms not to develop, e.g., preventing myelosuppression, weight loss, inflammation, and/or infection, and/or preventing progression of one or more of these features to a harmful state; (ii) inhibition, that is, arresting or slowing the development or further development of clinical symptoms, e.g., mitigating or completely inhibiting an active (ongoing) feature of mucositis so that the feature is decreased to the degree that it is no longer seriously harmful, which decrease can include complete elimination of mucositis from the host; and/or (iii) relief, that is, causing the regression of clinical symptoms, e.g., causing full or partial relief of myelosuppression, weight loss, inflammation, infection, and/or other symptoms caused by treatment of the host with radiation therapy.

For example, mucositis severity, including oral mucositis (stomatitis), can easily be assessed by visual inspection of mouth, throat and/or anal lesions associated with the condition, interrogation of test subjects or patients (do you have soreness of the mouth or throat?) or by use of any, or all, of three well accepted disease scales: the five-grade World Health Organization (WHO) oral-toxicity scale (Miller A B et al., Cancer 1981; 47:207-214), the five-grade Radiation Therapy Oncology Group (RTOG) acute radiation-morbidity scoring criteria for mucous membranes, National Cancer Institute (NCI) common toxicity criteria, version 2.0. Apr. 30, 1999 and the four-grade Western Consortium for Cancer Nursing Research (WCCNR) revised staging system for oral mucositis. Assessing stomatitis: refinement of the Western Consortium for Cancer Nursing Research (WCCNR) stomatitis staging system (Can Oncol Nurs J 1998; 8:160-165). Thus, the effect of treatment with a radiation toxicity reducing adjuvant can readily be determined using any, or all, of these test systems. In some instances, methods of the invention results in an increased crypt survival, e.g., as described in the experimental section below. While the magnitude of increased crypt survival may vary, in some instances the magnitude of increase is 2-fold or greater, such as 5-fold or greater, including 10-fold or greater, up to 50-fold or greater.

A variety of subjects are treatable according to the subject methods. Generally, such hosts are "mammals" or "mammalian," where these terms are used broadly to describe organisms which are within the class Mammalia, including the orders carnivore (e.g., dogs and cats), Rodentia (e.g., mice, guinea pigs, and rats), and primates (e.g., humans, chimpanzees, and monkeys). In many embodiments, the subjects will be humans.

In certain embodiments, the subjects will be subjects that have been diagnosed for and are, therefore, in need of administration of the radiation therapy. In certain embodiments, the methods may include diagnosing the subject for the presence of the disease condition to be treated by administration of the radiation therapy.

The subject methods find use in, among other applications, the treatment of cellular proliferative disease conditions, including neoplastic disease conditions, e.g., cancers, and autoimmune diseases. In such applications, an effective amount of the radiation therapy and radiation toxicity-reducing adjuvant is administered to the subject in need thereof. Treatment is used broadly as defined above, to include at least amelioration in one or more of the symptoms of the disease, as well as a complete cessation thereof, as well as a reversal and/or complete removal of the disease condition, i.e., a cure.

There are many disorders associated with a dysregulation of cellular proliferation, e.g., cellular proliferative disorders. The conditions of interest include, but are not limited to, conditions described below.

The subject methods may be employed in the treatment of a variety of conditions where there is proliferation and/or migration of smooth muscle cells, and/or inflammatory cells into the intimal layer of a vessel, resulting in restricted blood flow through that vessel, e.g., neointimal occlusive lesions. Occlusive vascular conditions of interest include atherosclerosis, graft coronary vascular disease after transplantation, vein graft stenosis, peri-anastomatic prosthetic graft stenosis, restenosis after angioplasty or stent placement, and the like.

Diseases where there is hyperproliferation and tissue re-modeling or repair of reproductive tissue, e.g., uterine, testicular and ovarian carcinomas, endometriosis, squamous and glandular epithelial carcinomas of the cervix, etc. are reduced in cell number by administration of the subject compounds Tumors of interest for treatment include carcinomas, e.g. colon, duodenal, prostate, breast, melanoma, ductal, hepatic, pancreatic, renal, endometrial, stomach, dysplastic oral mucosa, polyposis, invasive oral cancer, non-small cell lung carcinoma, transitional and squamous cell urinary carcinoma etc.; neurological malignancies, e.g., neuroblastoma, gliomas, etc.; hematological malignancies, e.g., childhood acute leukemia, acute myelogenous leukemias, acute lymphocytic leukemia, non-Hodgkin's lymphomas, chronic lymphocytic leukemia, malignant cutaneous T-cells, mycosis fungoides, non-MF cutaneous T-cell lymphoma, lymphomatoid papulosis, T-cell rich cutaneous lymphoid hyperplasia, bullous pemphigoid, discoid lupus erythematosus, lichen planus, gestational choriocarcinoma, chorioadenoma destruens, hydatidiform mole, epidermoid cancers of the head and neck, trophoblastic neoplasms such as choriocarcinoma, chorioadenoma destruens, hydatidiform mole, etc., and the like.

Some cancers of particular interest include breast cancers, which are primarily adenocarcinoma subtypes. Ductal carcinoma in situ (DCIS) is the most common type of noninvasive breast cancer. In DCIS, the malignant cells have not metastasized through the walls of the ducts into the fatty tissue of the breast. Infiltrating (or invasive) ductal carcinoma (IDC) has metastasized through the wall of the duct and invaded the fatty tissue of the breast. Infiltrating (or invasive) lobular carcinoma (ILC) is similar to IDC, in that it has the potential metastasize elsewhere in the body. About 10% to 15% of invasive breast cancers are invasive lobular carcinomas.

Also of interest is non-small cell lung carcinoma. Non-small cell lung cancer (NSCLC) is made up of three general subtypes of lung cancer. Epidermoid carcinoma (also called squamous cell carcinoma) usually starts in one of the larger bronchial tubes and grows relatively slowly. The size of these tumors can range from very small to quite large. Adenocarcinoma starts growing near the outside surface of the lung and may vary in both size and growth rate. Some slowly growing adenocarcinomas are described as alveolar cell cancer. Large cell carcinoma starts near the surface of the lung, grows rapidly, and the growth is usually fairly large when diagnosed. Other less common forms of lung cancer are carcinoid, cylindroma, mucoepidermoid, and malignant mesothelioma.

Melanoma is a malignant tumor of melanocytes. Although most melanomas arise in the skin, they also may arise from mucosal surfaces or at other sites to which neural crest cells migrate. Melanoma occurs predominantly in adults, and more than half of the cases arise in apparently normal areas of the skin. Prognosis is affected by clinical and histological factors and by anatomic location of the lesion. Thickness and/or level of invasion of the melanoma, mitotic index, tumor infiltrating lymphocytes, and ulceration or bleeding at the primary site affect the prognosis. Clinical staging is based on whether the tumor has spread to regional lymph nodes or distant sites. For disease clinically confined to the primary site, the higher the chance of lymph node metastases and the worse the prognosis is associated with greater thickness and depth of the local invasion of the melanoma. Melanoma can spread by local extension (through lymphatics) and/or by hematogenous routes to distant sites. Any organ may be involved by metastases, but lungs and liver are common sites.

Other proliferative diseases of interest relate to epidermal hyperproliferation, tissue remodeling, and repair. For example, the chronic skin inflammation of psoriasis is associated with hyperplastic epidermal keratinocytes as well as infiltrating mononuclear cells, including CD4+ memory T cells, neutrophils, and macrophages.

The methods of the present invention can provide a method of treating many, if not most, malignancies, including tumors derived from cells selected from skin, connective tissue, adipose, breast, lung, stomach, pancreas, ovary, cervix, uterus, kidney, bladder, colon, prostate, central nervous system (CNS), retina and blood, and the like. Representative cancers of interest include, but are not limited to, head, neck and lung tissue (e.g., head and neck squamous cell carcinoma, non-small cell lung carcinoma, small cell lung carcinoma) gastrointestinal tract and pancreas (e.g., gastric carcinoma, colorectal adenoma, colorectal carcinoma, pancreatic carcinoma); hepatic tissue (e.g., hepatocellular carcinoma), kidney and urinary tract (e.g., dysplastic urothelium, bladder carcinoma, renal carcinoma, Wilms tumor), breast (e.g., breast carcinoma); neural tissue (e.g., retinoblastoma, oligodendroglioma, neuroblastoma, and malignant meningioma; skin (e.g., normal epidermis, squamous cell carcinoma, basal cell carcinoma, melanoma).

The methods of the present invention also can provide a method of treating hematological tissues (e.g., lymphoma, chronic myeloid leukemia (CML), acute promyelocytic leukemia (APL), acute lymphoblastic leukemia (ALL), acute myeloid leukemia (AML), and the like.

The dose administered to an animal, particularly a human, in the context of the present invention should be sufficient to affect a prophylactic or therapeutic response in the animal over a reasonable time frame. One skilled in the art will recognize that dosage will depend on a variety of factors, including the strength of the radiation therapy employed, the dose of radiation therapy, the dosing regimen used for the radiation therapy, the condition of the animal, and the body weight of the animal, as well as the severity of the illness and the stage of the disease.

The size of the dose will also be determined by the existence, nature, and extent of any adverse side effects that might accompany the administration of a particular compound.

In the treatment of some individuals with the compounds of the present invention, it may be desirable to use a high dose regimen in conjunction with a rescue agent for non-malignant cells. In such treatment, any agent capable of rescue of non-malignant cells can also be employed, such as citrovorum factor, folate derivatives, or Leucovorin in addition to the adjuvant. Such rescue agents are well known to those of ordinary skill in the art.

Kits & Systems

Also provided are kits and systems that find use in practicing the subject methods, as described above. For example, kits and systems for practicing the subject methods may include one or more pharmaceutical formulations which include the radiation toxicity-reducing adjuvant. Where the radiation therapy includes an internally administered entity, such as described above, the kit may further include that entity. As such, in certain embodiments the kits may include a single pharmaceutical composition, present as one or more unit dosages, where the composition includes radiation toxicity-reducing adjuvant. The kit components may be present in any suitable packaging, including sterile packaging.

In addition to the above components, the subject kits may further include instructions for practicing the subject methods. These instructions may be present in the subject kits in a variety of forms, one or more of which may be present in the kit. One form in which these instructions may be present is as printed information on a suitable medium or substrate, e.g., a piece or pieces of paper on which the information is printed, in the packaging of the kit, in a package insert, etc. Yet another means would be a computer readable medium, e.g., diskette, CD, etc., on which the information has been recorded. Yet another means that may be present is a website address which may be used via the internet to access the information at a removed site. Any convenient means may be present in the kits.

Kits of specific interest are those that include a 2, 2'-anhydropyrimidine pharmaceutical composition of the invention and suitable for practicing the subject methods of the invention, such as for reducing radiation therapy-induced mucositis, including stomatitis, and such as for treatment of a cellular proliferative disorder.

The following examples further illustrate the present invention but should not be construed in any way as limiting its scope.

EXPERIMENTAL

Radiation therapy remains an important component of cancer treatment with approximately 50% of all cancer patients receiving radiation therapy during their course of illness; (Baskar et al., Int J Med Sci.; 9(3), 193-199 (2012)). Because radiotherapy and chemotherapy are designed to target rapidly proliferating tumors, it can also adversely affect rapidly dividing cells in healthy tissues. One of the most rapidly dividing tissues of the body is that of the small intestine, and hence, it is a common site of collateral toxicity during cancer therapy. This is also true of the mucosal lining of other parts of the gastrointestinal tract. Thus, mucositis is, as expected, a serious, often observed adverse event of radiation treatment (Maria et al. Front Oncol., 7, 89, 2017)). Problems associated with such damage from mucositis can delay treatment or cause therapeutic doses to be reduced, impairing the success of the cancer therapy.

Damaged intestinal crypt cells are critical mediators of intestinal damage post radiation. Anti-cancer treatments that kill crypt cells lead to a breakdown of the mucosal barrier (ulceration). Treatments that spare more crypt cells during cancer therapy will improve patient wellbeing, allow dose escalation, and increased cure rates. The number of surviving regenerating intestinal crypt cells is an accepted marker of mucosal health post radiation (Bowen et al., Support Care Cancer, 14(7), 713-731 (2006)). A low number of regenerating crypt cells reflects tissue damage and predicts the emergence of mucositis.

Following radiation, crypt cell production is inhibited but cell maturation and loss continues—resulting in a gradual shrinkage of the crypt and villus. If a clonogenic cell is killed an exponential number of daughter cells are therefore lost, unless a remaining clonogenic cell can divide and replace the lost cells by symmetrical division (generating two daughter clonogenic cells etc. which can amplify the rate of repair). Only when all the clonogenic cells within the crypt are lost is the crypt therefore stabilized. If several crypts are killed the lost cell production will generate a breach in the epithelial barrier, or ulcer. The more crypts that are lost the greater the level of ulceration, which is manifest as the symptoms of mucositis. Agents that therefore reduce mucositis severity will also demonstrate improved crypt survival at time-points before disease symptoms become apparent.

The aim of the study whose results are provided in FIG. 2-6 was to determine the effect of TK-112690 on small intestinal crypt survival, in a murine total-body irradiation (TBI) model of intestinal mucositis.

Test System

Animal Species: Mouse (*Mus musculus*)
Strain/substrain: C57BL6 (negative for *Klebsiella oxytoca*)
Source: Jackson Laboratories, MP-14, Bar Harbour, Me 04609, USA
Total animals: 40 males plus 5 spares
Body weight range: 18 to 25 g at start of treatment
Animal ages: 10 to 12 weeks at start of treatment
Housing: Animals were individually housed in rodent polycarbonated bins with bedding (irradiated Teklad sani chips) equipped with water bottles. Following group assignment, all cages were clearly labeled with a color-coded cage card indicating at least the study number and animal number.
Animal Identification: Each animal was individually identified using a permanent marker.
Group Animal Numbers: Each animal was given a four-number identification code. The first number corresponds to the respective dose group (1-4). The second number refers to whether the animal is the original animal, for instance the number 0, or a replacement, for instance the number 1, The third and fourth numbers identify the animal's rank within each group.

Room Environment: The animal room environment was set to maintain a temperature of 21±3° C., a relative humidity of 50±20%; and a light dark cycle of 12 hours light/12 hours dark, except during Study Plan-designated procedures.

Diet/Water: A standard certified commercial chow (Envigo Teklad Certified Irradiated Global Rodent Diet #2918C) was provided to the animals ad libitum except during designated procedures. Treats or fruits/vegetables were provided as part of the animal enrichment program. Concentrations of the contaminants (e.g., heavy metals, aflatoxin, organophosphate and chlorinated hydrocarbons) were routinely measured by the manufacturers. Acidified (pH between 2.75 and 3.25) municipal tap water (which had been exposed to ultraviolet light and purified by reverse osmosis) was provided to all animals ad libitum, except during designated procedures, via water bottles. Water bottles were changed at least every 3 days prior to irradiation and every 2 days after irradiation. Acidified water was changed every day after irradiation. During transportation and irradiation, animals were provided with food and water gel packs. Animals received water gel packs at least 2 days before transportation to acclimate to this type of hydration supplement and this procedure continued until necropsy. In addition, wetted food was provided to the animals on the bottom of the bins from Day 1 to the day of necropsy.

Acclimation: An acclimation period of at least 14 days was allowed between receipt of the animals and the start of dosing to accustom the animals to the laboratory environment.

Animal Assignment: During the acclimation period, animals were separately assigned to dose groups by a randomizing stratification system based on body weights. For logistical reasons, the animals were assigned to replicate subgroups, which may initiate dosing on different days.

Study Design

The test item and reference item/vehicle are administered by intraperitoneal injection (ip) or oral gavage (po) 1.5 to 2 hour prior and 4 hours post irradiation and then twice daily (12 hours apart) for 4 consecutive days (Days 2 to 5), as shown below:

TABLE 1

Study Design

| Treatment Group | Dose Route | Targeted IrRadiation Dose Level (Gy)** | Test Item Dose Level (mg/kg/dose) | Test Item Dose Concentration (mg/mL) | Dose Volume (mL/kg) | Number of Males |
|---|---|---|---|---|---|---|
| 1. Control* | IP | 12 | 0 | 0 | 4 | 8 |
| 2. TK-112690 | IP | | 60 | 15 | | 12 |
| 3. Control* | Oral | | 0 | 0 | 6 | 8 |
| 4. TK-112690 | Oral | | 240 | 40 | | 12 |

*Group 1 and 3 animals will receive the reference item/vehicle, Phosphate Buffered Saline (PBS, pH 7.4)
**Targeted radiation dose rate will be 60 cGy/minute.
ip: Intraperitoneal In addition, uridine is administered twice daily by intraperitoneal injection to Group 2 and 4 animals, 30 minutes post TK-112690 administration (1-1.5 h prior irradiation), as shown in the table below.

TABLE 2

Design for Uridine Dosing

| Treatment Group | Dose Route | Uridine Dose Level (mg/kg/dose) | Uridine Concentration (mg/mL) | Dose Volume (mL/kg) | Number of Males |
|---|---|---|---|---|---|
| 2. TK-112690 | IP | 60 | 15 | 4 | 12 |
| 4. TK-112690 | IP | 60 | 15 | | 12 |

TK-112690 is an authentic uridine phosphorylase inhibitor. Uridine phosphorylase controls the systemic concentration of uridine. Uridine phosphorylase Inhibition of uridine phosphorylase leads to increase systemic uridine. Uridine is a known protectant whose activity is limited by its extremely rapid clearance (very, short elimination $t_{1/2}$). TK-112690 prolongs and increases the activity of uridine. The uridine dose was given along with the TK-112690 dose to assure that the mice had sufficient initial uridine to benefit from the TK-112690 treatment.

On Day 1, animals were exposed to partial body irradiation as follows. Animals were irradiated, in subsets of up to 15 mice in a custom designed restrainer where their left pelvic limb is extended and maintained in position with an elastic band. The left pelvic limb was shielded with a cerrobend structure. Dosimetry measurements using dosimeters (scanned inLight nanodots from Landauer), the theoretical dose rate, duration of irradiation, and the actual time of irradiation for each subset of animals were documented.

Animals were irradiated in a random order, not according to group number.

For each treatment session, two nanoDot dosimeters were placed between two layers of 5 mm superflab in the mouse restraining device and one nanoDot dosimeter was placed in the shielded area. The dosimeters were returned to Landauer for estimation of exposure. A Farmer ionization chamber was connected to an electrometer and was included in each radiation treatment to provide a quantification of the radiation dose. The energy recorded by the electrometer was converted to a radiation dose and was included in the study report. The ambient temperature and atmospheric pressure were recorded after each irradiation for calculation of real-time dosimetry.

Body measurements were taken from selected animals (30 mice) to calculate the radiation exposure time. Chest depth from the sternum to an equivalent point in the interscapular area was measured (in mm, with 2 decimals) using a caliper.

Prior to animal irradiation, the radiation dose was calibrated using an acrylic phantom placed in the same experimental set up that was used for animal irradiation. The measurements were taken using an ion chamber with a solid water phantom build-up.

Animals were transferred to the irradiation facility in a transport vehicle with controlled temperature, recorded very 5 min. During transportation, each animal was housed in divided bins (up to 8 animals/bin) with food and water gel packs. Clinical signs were monitored before the transfer to the radiation facility and upon return to the Test Facility.

Animals received a partial body irradiation dose of 12 Gy at the Irradiation Test Facility The dose rate of the 60Co gamma source was fixed at approximately 60 cGy per minute. Once the irradiation treatment was completed, animals were returned to the transport vehicle and returned to the Test Facility. Upon return to the Test Facility, the identification of the animal was verified to ensure all animals were accurately placed in the designated bin for each animal.

In-Life Observations

Mortality checks were recorded concomitantly with the cage-side observations (see below for clinical signs), during all phases of the study. Clinical signs (ill health, behavioral changes, etc.) were recorded on all animals during all phases of the study. A detailed clinical examination was performed on each animal at least prior to animal assignment, on Day −1, Day −6, and Day 8 (prior to necropsy). Body weights were recorded for all animals at least once prior to animal assignment, on Day −8, then daily starting on Day −1, and including the day of necropsy.

Study Termination

Blood samples (maximum volume) were collected terminally from scheduled and unscheduled animals. Each terminal blood sample was collected from abdominal aorta vein, under gas anesthesia with isoflurane, into tubes containing K2 EDTA as anticoagulant and kept on wet ice pending centrifugation. Samples were centrifuged under refrigeration (set to +4° C. and 1500 g RCF) for targeted 10 minutes. Plasma was immediately be placed on wet ice and then transferred into 2 tubes, placed on dry ice pending storage in a freezer set to −70° C. until shipment (stored within 1 hour of plasma harvest).

After blood collection, all animals were euthanized by exsanguination and subjected to a macroscopic examination. Necropsy consisted of an external macroscopic examination, including identification of all clinically-recorded lesions, as well as a detailed internal examination. The order of necropsy for each prosection group began with a control (PBS) animal. In order to avoid autolytic changes, the macroscopic examination of the carcass was conducted as soon as possible on all euthanized animals.

On completion of the macroscopic examination, the entire small intestine was retained from all animals and placed in neutral buffered 10% formalin for preservation. Two (2) bone marrow smears were collected from the femur at scheduled and unscheduled necropsies (for possible examination) and stained with an aqueous two-part Romanowsky stain.

The small intestines were paraffin embedded, sectioned, and H&E stained to evaluate the number of surviving regenerating intestinal crypts present.

Results

There was no mortality reported during the study. The microscopic examination provided no observations not expected with the radiation treatment.

FIG. 1 depicts a set of data expressing the difference between the body weight pre-dose and on Day 6. Weight loss is one cardinal features of mucositis (Davy and Heathcote, Support Care Cancer. 2020, September 5). Twenty-four mice were treated bid with TK-112690, a 2,2'-anhydropyrimidine radiation toxicity-reducing adjuvant according to an embodiment of the invention. The test article doses were 60 mg/kg ip or 240 mg/kg po TK-112690 and uridine 60 mg/kg. Sixteen mice were treated with PBS. All animals were treated with 12 Gy total body radiation for 5 days. The difference in body weight (grams) between pre-treatment and day 6 was analyzed using Z scores.

If all the data from the study is combined (ip and po dosing drug and PBS), a modest, highly statistically significant (p=0.012) protection from weight loss, is observed. Support for combining ip and po doses can be found in the data provided in FIG. 2 which demonstrates that the PBS dose provides identical weight loss when given ip or po, and FIG. 3 which demonstrates that the systemic concentration and elimination profile of a 60 mg/kg ip dose and a 240 mg/kg oral dose of TK-112690 are virtually identical.

Figure 2:
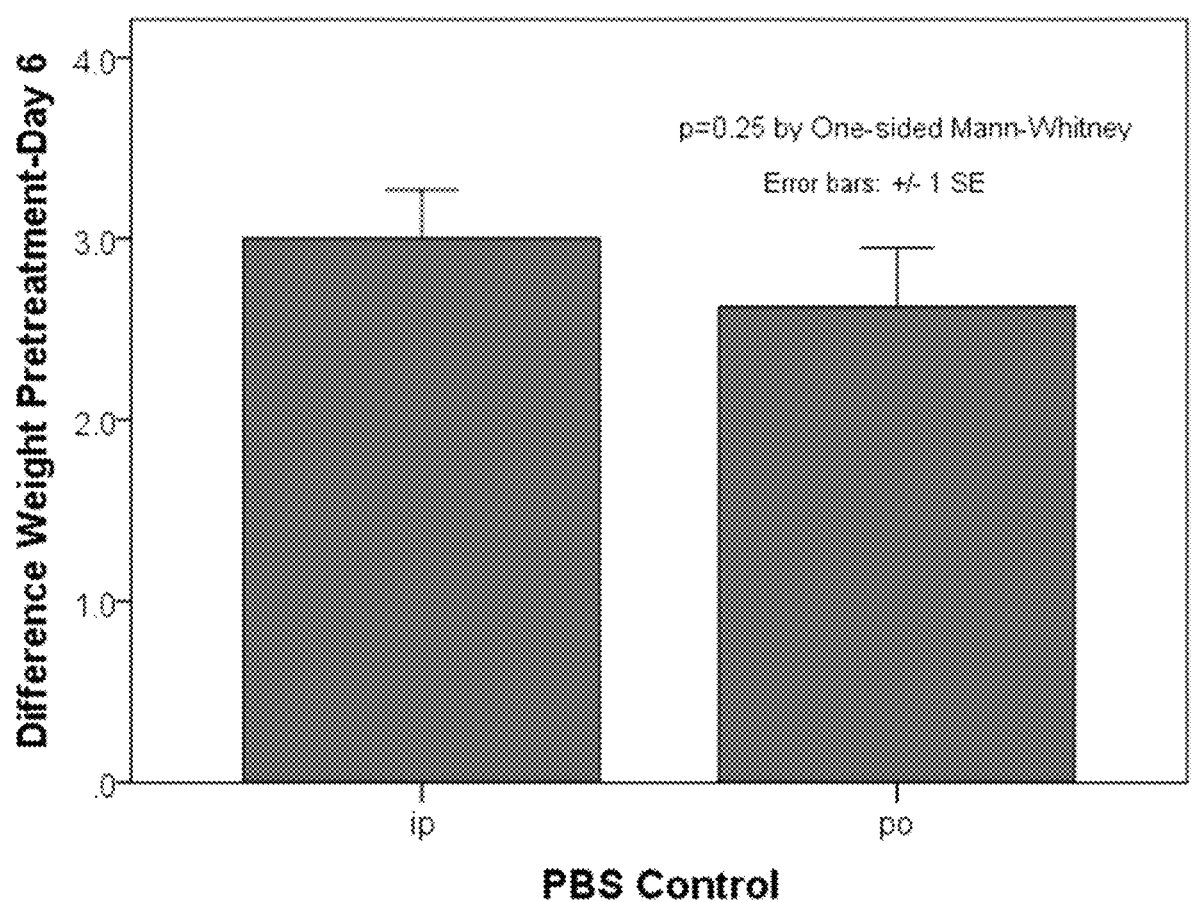
FIG. 2 depicts a set of data expressing the mean difference in body weights between pretreatment and Day 6 for eight mice treated with PBS ip and eight mice treated with PBS po. All mice were treated with 12 Gy total body radiation for 5 days. The difference in body weight (grams) between pre-treatment and day 6 were analyzed using Z scores.

FIG. 2 depicts a set of data expressing the mean difference in body weights between pretreatment and Day 6 for eight mice treated with PBS ip and eight mice treated with PBS po. All mice were treated with 12 Gy total body radiation for 5 days. The difference in body weight (grams) between pre-treatment and day 6 were analyzed using Z scores.

The Z scores for ip and po dosing are not different statistically.

Figure 3:
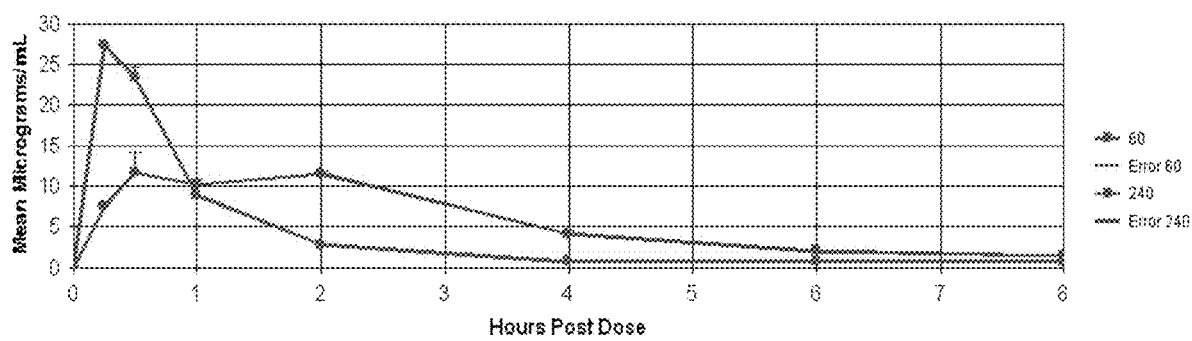
FIG. 3 depicts a set of data expressing plasma concentration profile over 8 hours in mice administered either 60 mg/kg of TK-112690 ip or 240 mg/kg po by gavage.

FIG. 3 depicts a set of data expressing plasma concentration profile over 8 hours in mice administered either 60 mg/kg of TK-112690 ip or 240 mg/kg po by gavage. Plasma samples from 3 animals/timepoint were analyzed. CD-1 Female Mice (n=3) were dosed with either 60 (ip) or 240 (po) mg/kg TK-112690 in PBS. Blood samples were obtained at the designated timepoints, and the samples analyzed for drug using LC/MS.

Evaluating the bioavailability of TK-112690 suggests that a 60 mg/kg ip dose is essentially equivalent to 240 mg/kg po dose. Elimination half-lives were similar ip or po: Approximately 2.5 hours. The $AUC_{0 \to Last}$ values were also similar: Approximately 30 (micrograms/mL)*hour for and 40 (micrograms/mL)*hour for po.

Figure 4:
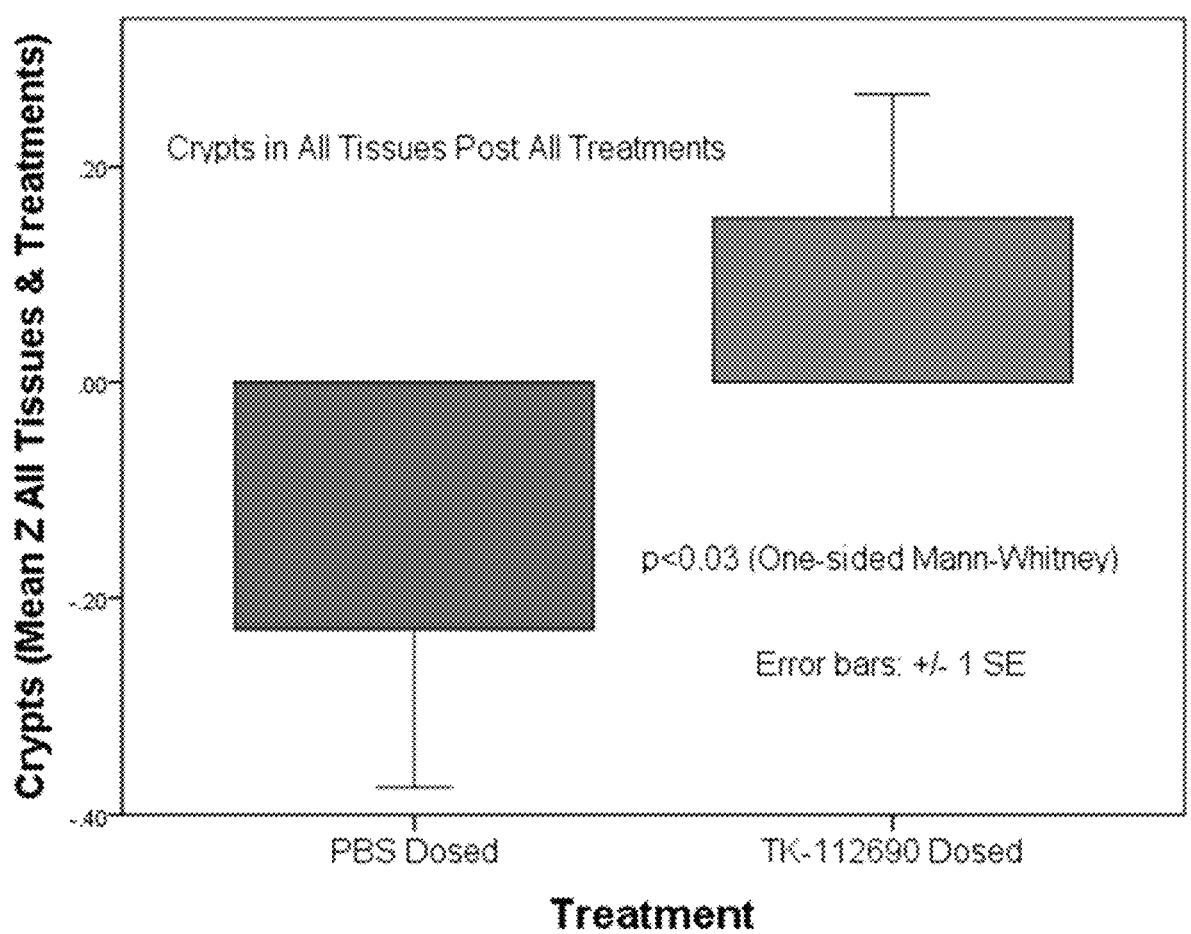
FIG. 4 depicts a set of intestinal crypt cell numbers demonstrating that TK-112690 increased survival of these critical intestinal cells when administered to mice experiencing total body radiation. Twenty-four mice were treated bid with TK-112690 (60 mg/kg ip or 240 mg/kg po) and uridine 60 mg/kg. Sixteen mice were treated with phosphate buffered saline (PBS). All mice were irradiated with 12 Gy total body radiation for 5 days. The number of intestinal crypts (jejunum, duodenum, ileum) were determined by histopathology for surviving crypts. The crypt numbers were then evaluated using Z scores.

FIG. 4 depicts a set of intestinal crypt cell numbers demonstrating that TK-112690 increased survival of these critical intestinal cells when administered to mice experiencing total body radiation. Twenty-four mice were treated bid with TK-112690 (60 mg/kg ip or 240 mg/kg po) and uridine 60 mg/kg. Sixteen mice were treated with phosphate buffered saline (PBS). All mice were irradiated with 12 Gy total body radiation for 5 days. The number of intestinal crypts (jejunum, duodenum, ileum) were determined by histopathology for surviving crypts. The crypt numbers were then evaluated using Z scores.

Mice receiving the PBS vehicle had a lower level of crypt survival compared to the mice administered the TK-112690 and uridine. The result was statistically significant (p=0.03). Based on these data, treatment with TK-112690 lessens the mucosal damage associated with radiation treatment.

Figure 5:
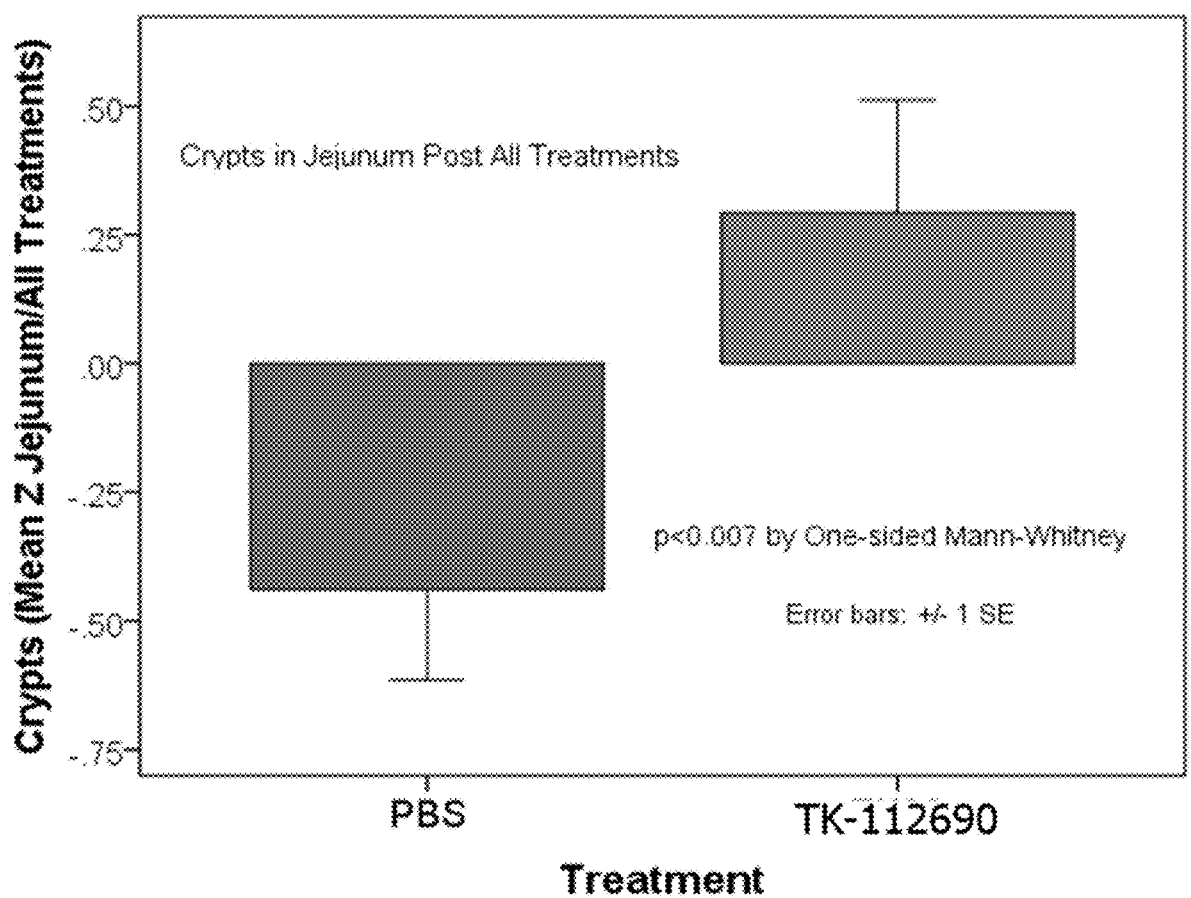
FIG. 5 depicts a set of data expressed as intestinal crypt cell numbers demonstrating that TK-112690 increased survival of these critical intestinal cells in the jejunum when administered to mice experiencing total body radiation. The jejunum Twenty-four mice were treated bid with TK-112690 (60 mg/kg ip or 240 mg/kg po) and uridine 60 mg/kg, and 16 mice were treated with PBS. All mice were irradiated with 12 Gy total body radiation for 5 days. The number of intestinal crypts in the jejunum were determined by histopathology for surviving crypts. The crypt numbers were then evaluated using Z scores.

FIG. 5 depicts a set of data expressed as intestinal crypt cell numbers demonstrating that TK-112690 increased survival of these critical intestinal cells in the jejunum when administered to mice experiencing total body radiation. Twenty-four mice were treated bid with TK-112690 (60 mg/kg ip or 240 mg/kg po) and uridine 60 mg/kg, and 16 mice were treated with PBS. All mice were irradiated with 12 Gy total body radiation for 5 days. The number of intestinal crypts in the jejunum were determined by histopathology for surviving crypts. The crypt numbers were then evaluated using Z scores.

Mice receiving the PBS vehicle had a lower level of crypt survival compared to the mice administered the TK-112690 and uridine. The result was statistically significant (p=0.007). Based on these data, treatment with TK-112690 minimizes the mucosal damage in the jejunum associated with radiation treatment.

Figure 6:
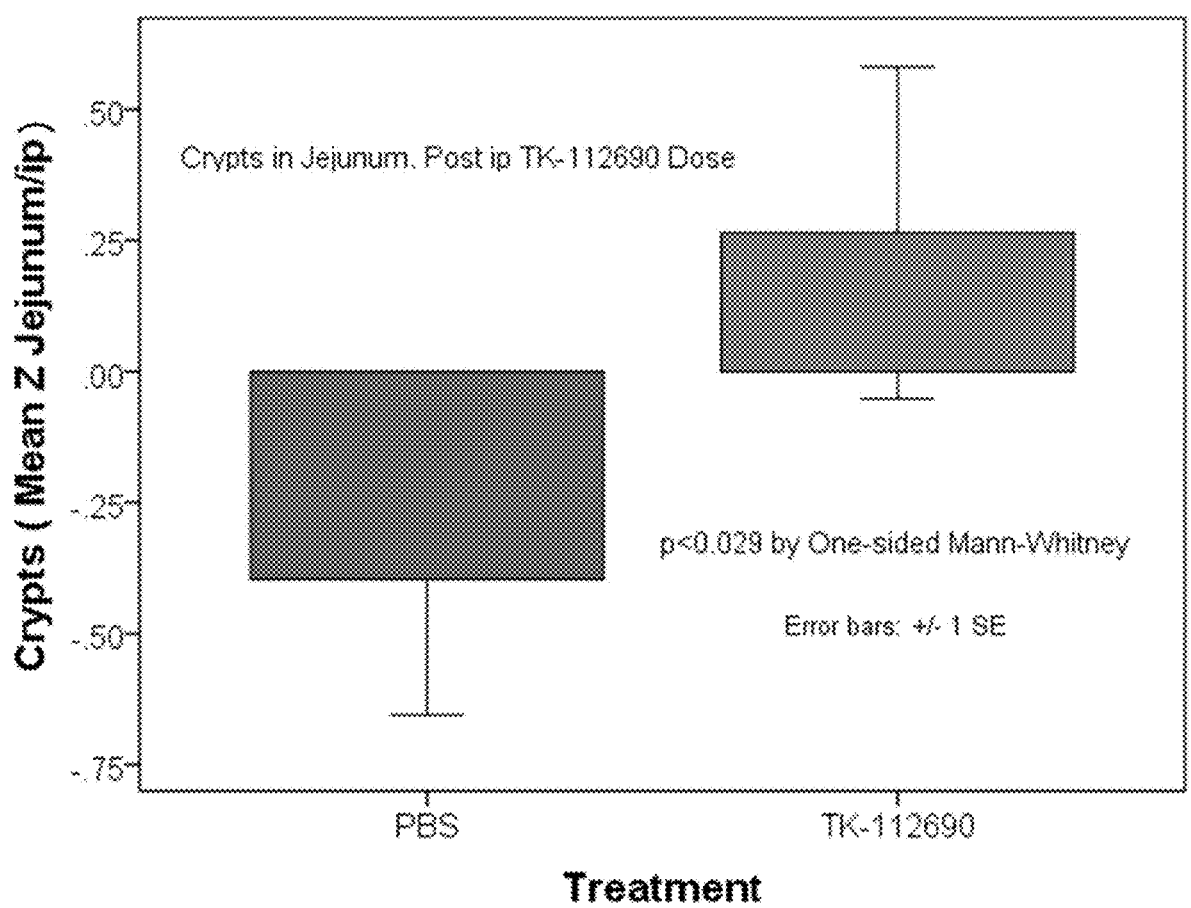
FIG. 6 depicts a set of data expressed as intestinal crypt cell numbers demonstrating that TK-112690 increased survival of these critical intestinal cells in the jejunum when administered ip to mice experiencing total body radiation. Twelve mice were treated bid with 60 mg/kg ip TK-112690 and uridine 60 mg/kg and 8 mice were treated with PBS. All mice were irradiated with 12 Gy total body radiation for 5 days. The number of intestinal crypts in the jejunum were determined by histopathology for surviving crypts. The crypt numbers were then evaluated using Z scores.

FIG. 6 depicts a set of data expressed as intestinal crypt cell numbers demonstrating that TK-112690 increased survival of these critical intestinal cells in the jejunum when administered ip to mice experiencing total body radiation. Twelve mice were treated bid with 60 mg/kg ip TK-1126900 and uridine 60 mg/kg and 8 mice were treated with PBS. All mice were irradiated with 12 Gy total body radiation for 5 days. The number of intestinal crypts in the jejunum were determined by histopathology for surviving crypts. The crypt numbers were then evaluated using Z scores.

Mice receiving the PBS vehicle had a lower level of surviving crypts in the jejunum compared to the mice administered the ip TK-112690 and uridine. The result was statistically significant (p=0.029). Based on these data, treatment with TK-112690 ip ameliorates the mucosal damage in the jejunum associated with radiation treatment.

Figure 7:
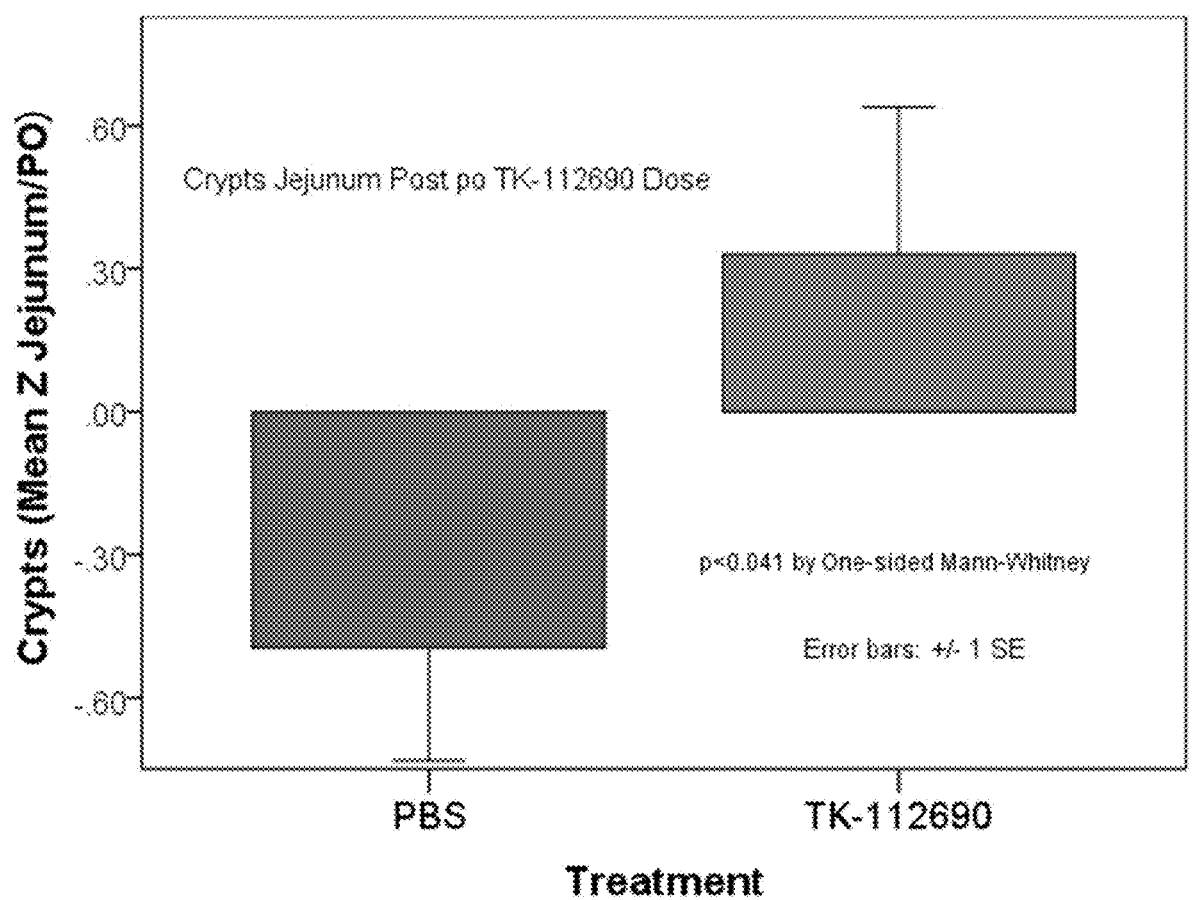
FIG. 7 depicts a set of data expressed as intestinal crypt cell numbers demonstrating that TK-112690 increased survival of these critical intestinal cells in the jejunum when administered po to mice experiencing total body radiation. Twelve mice were treated bid with TK-112690 (240 mg/kg po) and uridine 60 mg/kg and 8 mice were treated with PBS. All mice were irradiated with 12 Gy total body radiation for 5 days. The number of intestinal crypts in the jejunum were determined by histopathology for surviving crypts. The crypt numbers were then evaluated using Z scores.

FIG. 7 depicts a set of data expressed as intestinal crypt cell numbers demonstrating that TK-112690 increased survival of these critical intestinal cells in the jejunum when administered po to mice experiencing total body radiation. Twelve mice were treated bid with TK-112690 (240 mg/kg po) and uridine 60 mg/kg and 8 mice were treated with PBS. All mice were irradiated with 12 Gy total body radiation for 5 days. The number of intestinal crypts in the jejunum were determined by histopathology for surviving crypts. The crypt numbers were then evaluated using Z scores.

Mice receiving the PBS vehicle had a lower level of surviving crypts in the jejunum compared to the mice administered the po TK-112690 and uridine. The result was statistically significant (p=0.041). Based on these data, treatment with TK-112690 po ameliorates the mucosal damage in the jejunum associated with radiation treatment.

Figure 8:
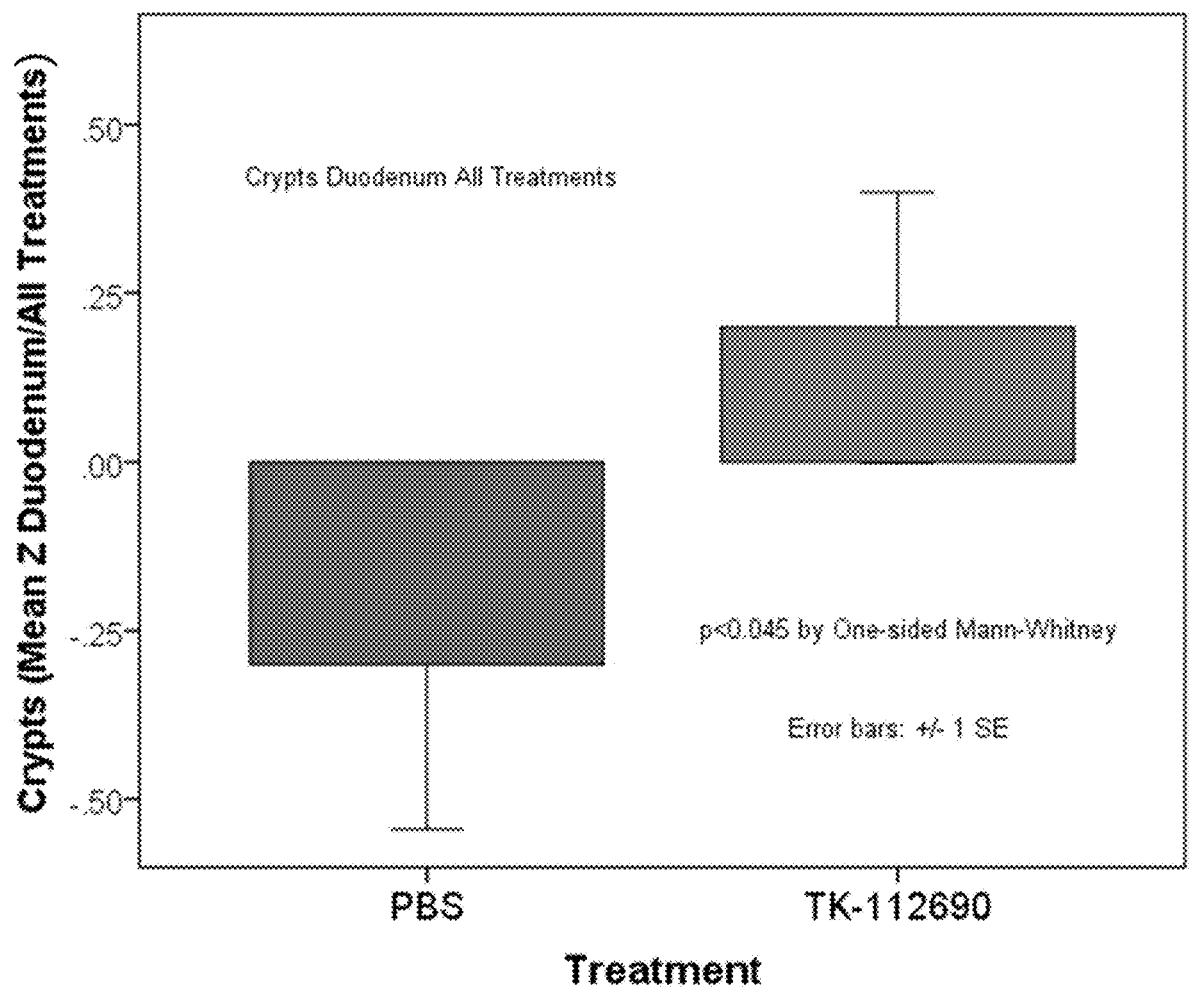
FIG. 8 depicts a set of data expressed as intestinal crypt cell numbers demonstrating that TK-112690 increased survival of these critical intestinal cells in the duodenum when administered to mice experiencing total body radiation. Twenty-four mice were treated bid with TK-112690 (60 mg/kg ip or 240 mg/kg po) and uridine 60 mg/kg and 16 mice were treated with PBS. All mice were irradiated with 12 Gy total body radiation for 5 days. The number of intestinal crypts in the duodenum were determined by histopathology for surviving crypts. The crypt numbers were then evaluated using Z scores.

FIG. 8 depicts a set of data expressed as intestinal crypt cell numbers demonstrating that TK-112690 increased survival of these critical intestinal cells in the duodenum when administered to mice experiencing total body radiation. Twenty-four mice were treated bid with TK-112690 (60 mg/kg ip or 240 mg/kg po) and uridine 60 mg/kg and 16 mice were treated with PBS. All mice were irradiated with 12 Gy total body radiation for 5 days. The number of intestinal crypts in the duodenum were determined by histopathology for surviving crypts. The crypt numbers were then evaluated using Z scores.

Mice receiving the PBS vehicle had a lower level of crypt survival the duodenum compared to the mice administered the TK-112690 and uridine. The result was statistically significant (p=0.046). Based on these data, treatment with TK-112690 ameliorates the mucosal damage in the duodenum associated with radiation treatment.

Although the foregoing invention has been described in some detail by way of illustration and example for purposes of clarity of understanding, it is readily apparent to those of ordinary skill in the art in light of the teachings of this invention that certain changes and modifications may be made thereto without departing from the spirit or scope of the appended claims.

Accordingly, the preceding merely illustrates the principles of the invention. It will be appreciated that those skilled in the art will be able to devise various arrangements which, although not explicitly described or shown herein, embody the principles of the invention and are included within its spirit and scope. Furthermore, all examples and conditional language recited herein are principally intended to aid the reader in understanding the principles of the invention and the concepts contributed by the inventors to furthering the art, and are to be construed as being without limitation to such specifically recited examples and conditions. Moreover, all statements herein reciting principles, aspects, and embodiments of the invention as well as specific examples thereof, are intended to encompass both structural and functional equivalents thereof. Additionally, it is intended that such equivalents include both currently known equivalents and equivalents developed in the future, i.e., any elements developed that perform the same function, regardless of structure. Moreover, nothing disclosed herein is intended to be dedicated to the public regardless of whether such disclosure is explicitly recited in the claims.

The scope of the present invention, therefore, is not intended to be limited to the exemplary embodiments shown and described herein. Rather, the scope and spirit of present invention is embodied by the appended claims. In the claims, 35 U.S.C. § 112(f) or 35 U.S.C. § 112(6) is expressly defined as being invoked for a limitation in the claim only when the exact phrase "means for" or the exact phrase "step for" is recited at the beginning of such limitation in the claim; if such exact phrase is not used in a limitation in the claim, then 35 U.S.C. § 112 (f) or 35 U.S.C. § 112(6) is not invoked.

What is claimed is:

1. A method of reducing radiation therapy induced toxicity in a subject, the method comprising: administering to a subject suffering from or likely to suffer from radiation therapy induced toxicity an effective amount of a 2,2'-anhydropyrimidine to reduce radiation therapy induced toxicity in the subject, wherein the subject is not receiving chemotherapy.

2. The method according to claim 1, wherein the 2,2'-anhydropyrimidine is a compound of formula (I):

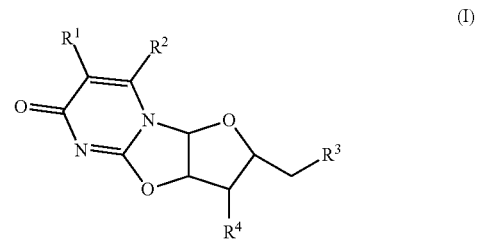

or the pharmaceutically acceptable salts, solvates, hydrates, and prodrug forms thereof, and stereoisomers thereof;

wherein:

each $R^1$, $R^2$, $R^3$ and $R^4$ is independently selected from the group consisting of hydrogen, substituted or unsubstituted heteroatom, substituted or unsubstituted alkyl, substituted or unsubstituted cycloalkyl, substituted or unsubstituted heterocycloalkyl, substituted or unsubstituted aryl, substituted or unsubstituted heteroaryl, substituted or unsubstituted aralkyl, halogen or pseudohalogen, carbohydrate, nucleic acid, amino acid, peptide, dye, fluorophore and polypeptide.

3. The method according to claim 2, wherein each $R^1$, $R^2$, $R^3$ and $R^4$ is independently selected from the group consisting of hydrogen, hydroxyl, sulfyhydryl, amino, hydroxymethyl, methoxy, halogen, pseudohalogen, and a substituted or unsubstituted lower hydrocarbon containing 1 to 20 carbons.

4. The method according to claim 3 wherein the lower hydrocarbon is selected from the group consisting of alkyl, alkenyl, alkanoyl, aryl, aroyl, aralkyl and alkylamino, and esters thereof.

5. The method according to claim 2, wherein $R^1$ is hydrogen, fluorine, methyl, ethyl, propyl, benzyl, or 2-bromovinyl; $R^2$ is hydrogen, hydroxyl fluorine, methyl, ethyl, propyl, benzyl, benzoyl, benzoyloxy, or 2-bromovinyl; and each $R^3$ and $R^4$ is independently selected from the group consisting of hydroxyl and benzoyloxy.

6. The method according to claim 5, wherein $R^1$ is hydrogen or methyl; $R^2$ is hydrogen; and each $R^3$ and $R^4$ is independently selected from the group consisting of hydroxyl and benzoyloxy.

7. The method according to claim 1, wherein the 2,2'-anhydropyrimidine is selected from the group consisting of: 2,2'-anhydro-5-methyluridine; 3'-O-benzoyl-2,2'-anhydrouridine; 3'-O-benzoyl-2,2'-anhydro-5-methyluridine; 5'-O-benzoyl-2,2'-anhydrouridine; and 5'-O-benzoyl-2,2'-anhydro-5-methyluridine.

8. The method according to claim 7, wherein the 2,2'-anhydropyrimidine is 2,2'-anhydro-5-methyluridine.

9. The method according to claim 7, wherein the 2,2'-anhydropyrimidine or derivative thereof is 3'-O-benzoyl-2,2'-anhydro-5-methyluridine.

10. The method according to claim 7, wherein the 2,2'-anhydropyrimidine or derivative thereof is 5'-O-benzoyl-2,2'-anhydro-5-methyluridine.

11. The method according to claim 1, wherein the 2,2'-anhydropyrimidine or derivative thereof comprises a stereoisomer.

12. The method according to claim 11, wherein the stereoisomer is selected from the group consisting of 2,2'-anhydro-1-(β-D-arabinofuranosyl)-5-methyluracil; 3'-O-benzoyl-2,2'-anhydro-1-(β-D-arabinofuranosyl)-uracil; 3'-O-benzoyl-2,2'-anhydro-1-(β-D-arabinofuranosyl)-5-methyluracil; 5'-O-benzoyl-2,2'-anhydro-1-(β-D-arabinofuranosyl)-uracil; and 5'-O-benzoyl-2,2'-anhydro-1-(β-D-arabinofuranosyl)-5-methyluracil.

13. The method according to claim 1, wherein the 2,2'-anhydropyrimidine is administered to the subject at the same time as radiation therapy.

14. The method according to claim 1, wherein the 2,2'-anhydropyrimidine is administered to the subject sequentially with radiation therapy.

15. The method according to claim 14, wherein the 2,2'-anhydropyrimidine is administered to the subject prior to the radiation therapy.

16. The method according to claim 14, wherein the 2,2'-anhydropyrimidine is administered to the subject after the radiation therapy.

17. The method according to claim 1, wherein the radiation therapy induced toxicity is mucositis.

18. The method according to claim 1, wherein the subject is suffering from a cellular proliferative disease.

19. The method according to claim 18, wherein the subject is administered only radiation therapy as a treatment for the cellular proliferative disease.

* * * * *